(12) United States Patent
Lee

(10) Patent No.: US 11,126,562 B2
(45) Date of Patent: Sep. 21, 2021

(54) METHOD AND APPARATUS FOR MANAGING MAP DATA IN A MEMORY SYSTEM

(71) Applicant: SK hynix Inc., Gyeonggi-do (KR)

(72) Inventor: Jong-Hwan Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 1 day.

(21) Appl. No.: 16/707,899

(22) Filed: Dec. 9, 2019

(65) Prior Publication Data
US 2020/0264985 A1    Aug. 20, 2020

(30) Foreign Application Priority Data

Feb. 19, 2019    (KR) .......................... 10-2019-0018973

(51) Int. Cl.
*G06F 12/00*    (2006.01)
*G06F 12/1009*    (2016.01)

(52) U.S. Cl.
CPC .... *G06F 12/1009* (2013.01); *G06F 2212/657* (2013.01)

(58) Field of Classification Search
CPC .. G06F 12/10; G06F 12/1009; G06F 2212/65; G06F 2212/657
See application file for complete search history.

(56) References Cited

U.S. PATENT DOCUMENTS

| | | | |
|---|---|---|---|
| 9,389,792 B1 * | 7/2016 | Camp .................. G06F 3/0655 | |
| 2004/0117580 A1 * | 6/2004 | Wu ..................... G06F 11/2097 | 711/170 |
| 2012/0246392 A1 | 9/2012 | Cheon | |
| 2014/0195725 A1 | 7/2014 | Bennett | |
| 2017/0192902 A1 * | 7/2017 | Hwang ............... G06F 12/0246 |
| 2017/0242794 A1 * | 8/2017 | Simionescu ........ G06F 12/0804 |
| 2017/0262365 A1 * | 9/2017 | Kanno .................... G06F 12/06 |
| 2020/0320012 A1 * | 10/2020 | Byun ...................... G06F 12/10 |

OTHER PUBLICATIONS

Universal Flash Storage (UFS) Version 2.1, JEDEC Standard, Mar. 2016, pp. 185, JESD220C, JEDEC Solid State Technology Association 2016, South Arlington, VA, USA (https://www.jedec.org/document_search?search_api_views_fulltect=JESD220C).

* cited by examiner

*Primary Examiner* — John A Lane
(74) *Attorney, Agent, or Firm* — IP & T Group LLP

(57) ABSTRACT

A memory system includes a memory device suitable for storing L2P map data including a logical address of an external device and a physical address of a memory device corresponding to the logical address, and a controller suitable for storing at least a portion of the L2P map data and state information of the L2P map data, and controlling data input/output of the memory device, wherein, when a write request, write data and a first physical address with a first logical address are received from an external device, the controller performs a write operation for the write request on a second physical address to which a logical address is not assigned, and invalidates the first physical address, and the controller transmits a first acknowledgement, which does not include the second physical address, to the external device, after completely performing the write operation.

20 Claims, 16 Drawing Sheets

| INVALID_INF | PA0 | PA1 | PA2 | PA3 | PA4 | PA5 | PA6 | PA7 | PA8 | PA9 |
|---|---|---|---|---|---|---|---|---|---|---|
| | 1 | 1 | 1 | 0 | 1 | 1 | 1 | 0 | 1 | 1 |

CMD with PA_1(PA3)

| INVALID_INF | PA0 | PA1 | PA2 | PA3 | PA4 | PA5 | PA6 | PA7 | PA8 | PA9 |
|---|---|---|---|---|---|---|---|---|---|---|
| | 1 | 1 | 1 | 1 | 1 | 1 | 1 | 0 | 1 | 1 |

| INVALID_INF | PA | LA |
|---|---|---|
| 1 | 0 | X |
| 1 | 1 | X |
| 1 | 2 | X |
| 0 | 3 | 0 |
| 1 | 4 | X |
| 1 | 5 | X |
| 1 | 6 | X |
| 0 | 7 | 2 |
| 1 | 8 | X |
| 1 | 9 | X |

| BLK | VPC |
|-----|-----|
| BLK0 | 10 |
| BLK1 | 15 |
| BLK2 | 15 |
| BLK3 | 16 |
| BLK4 | 8 |
| BLK5 | 7 |
| BLK6 | 20 |
| BLK7 | 1 |

| BLK | VPC |
|-----|-----|
| BLK0 | 10 |
| BLK1 | 15 |
| BLK2 | 15 |
| BLK3 | 15 |
| BLK4 | 8 |
| BLK5 | 7 |
| BLK6 | 20 |
| BLK7 | 0 |

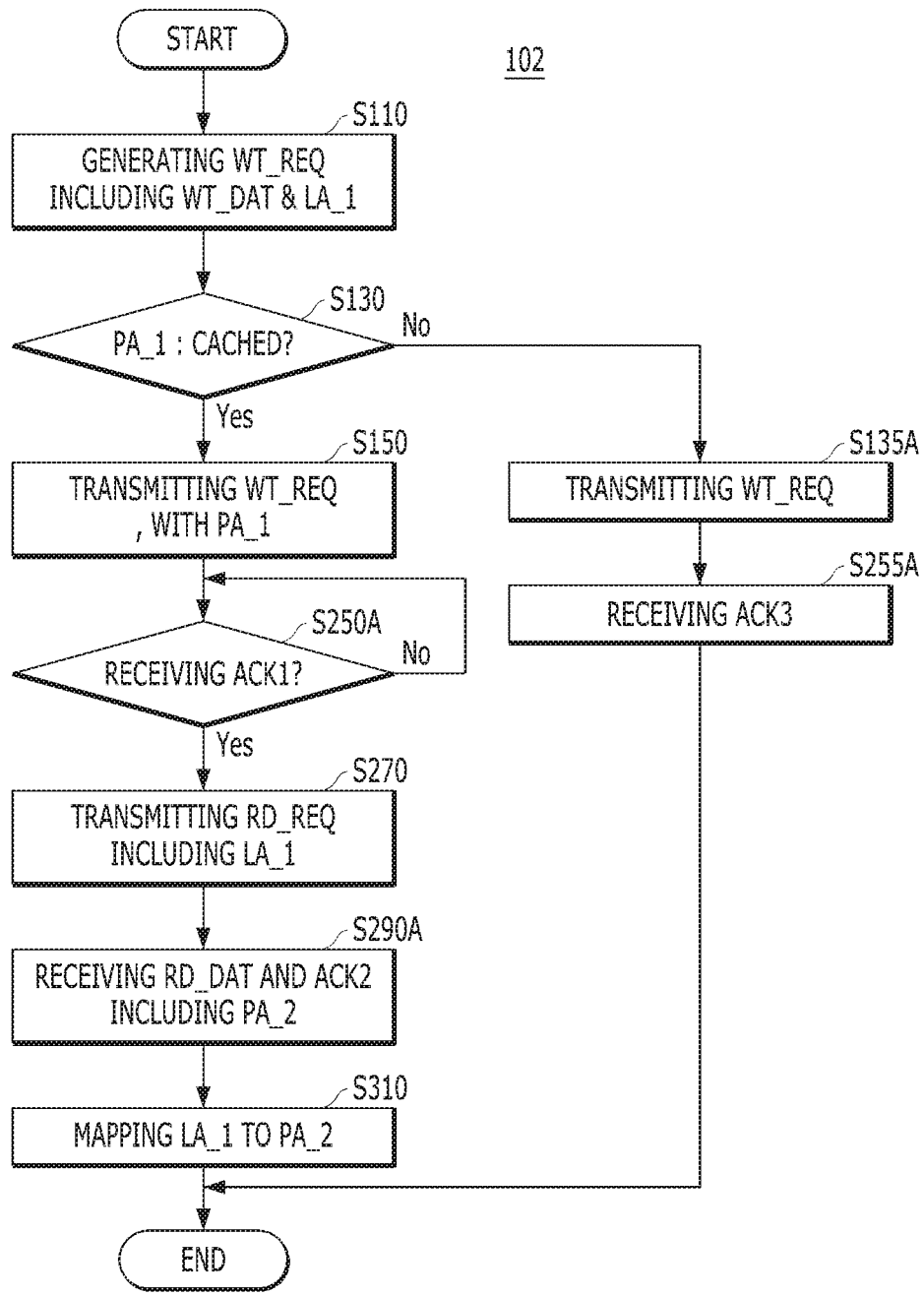

FIG. 12A

| Bit<br>Byte | 7 | 6 | 5 | 4 | 3 | 2 | 1 | 0 |
|---|---|---|---|---|---|---|---|---|
| 0 | \multicolumn{8}{c|}{OPERATION CODE} |
| 1 | Reserved | | | (MSB) | | | | |
| 2 | \multicolumn{8}{c|}{LOGICAL BLOCK ADDRESS} |
| 3 | | | | | | | | (LSB) |
| 4 | \multicolumn{8}{c|}{TRANSFER LENGTH} |
| 5 | \multicolumn{8}{c|}{CONTROL} |

(LA & PA)

| Bit<br>Byte | 7 | 6 | 5 | 4 | 3 | 2 | 1 | 0 |
|---|---|---|---|---|---|---|---|---|
| 0 | OPERATION CODE |||||||||
| 1 | | | | | | Reserved | | |
| 2 | (MSB) | | | | | | | |
| 3 | LOGICAL BLOCK ADDRESS |||||||||
| 4 | | | | | | | | |
| 5 | | | | | | | | (LSB) |
| 6 | Reserved | | | | | | | |
| 7 | (MSB) TRANSFER LENGTH |||||||||
| 8 | | | | | | | | (LSB) |
| 9 | CONTROL |||||||||

LA & PA

| Bit Byte | 7 | 6 | 5 | 4 | 3 | 2 | 1 | 0 |
|---|---|---|---|---|---|---|---|---|
| 0 | OPERATION CODE ||||||||
| 1 | | | | | Reserved | | Reserved | |
| 2 | (MSB) |||||||  |
| ... | LOGICAL BLOCK ADDRESS ||||||||
| 9 | | | | | | | | (LSB) |
| 10 | (MSB) |||||||  |
| ... | TRANSFER LENGTH ||||||||
| 13 | | | | | | | | (LSB) |
| 14 | Reserved | Reserved | | | | | | |
| 15 | CONTROL ||||||||

LA & PA

METHOD AND APPARATUS FOR MANAGING MAP DATA IN A MEMORY SYSTEM

CROSS-REFERENCE TO RELATED APPLICATIONS

The present application claims priority under 35 U.S.C. § 119(a) to Korean Patent Application No. 10-2019-0018973, filed on Feb. 19, 2019, which is incorporated herein by reference in its entirety.

BACKGROUND

1. Field

Various exemplary embodiments relate to a memory system and a data processing device including the same, and more particularly, to a method and an apparatus for controlling map data in a memory system.

2. Description of the Related Art

Recently, a paradigm for a computing environment has shifted to ubiquitous computing, which enables computer systems to be accessed virtually anytime and everywhere. As a result, the use of portable electronic devices, such as mobile phones, digital cameras, notebook computers and the like, is increasing. Such portable electronic devices typically use or include a memory system that embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), has high data access speed and low power consumption. Examples of a memory system having such advantages include a USB (Universal Serial Bus) memory device, a memory card having various interfaces, a solid state drive (SSD) or the like.

SUMMARY

Various embodiments of the present invention are directed to a memory system, a data processing system or a method for controlling the memory system and the data processing system, which may invalidate a physical address inputted together with a logical address and a write request from a host, without searching for map data associated with the logical address. Accordingly, the speed of an internal operation related to a write operation which is performed within the memory system is improved and efficiency of invalid data management is also improved.

Various embodiments of the present invention are directed to a memory system, a data processing system or a method for operating the memory system and the data processing system, in which the memory system may upload only map data to the host, for data requested by a host, and thus reduce overhead of data communication between the memory system and the host, which may be caused by transmitting (uploading or downloading) unnecessary map data.

Various embodiments of the present invention are directed to a memory system, a data processing system or a method for operating the memory system and the data processing system, which may invalidate a physical address inputted with a write request from a host based at least on state information associated with the physical address in the memory system, thus improving a speed of a write operation performed within the memory system and efficiency of invalid data management of the memory system.

Various embodiments of the present invention are directed to a memory system, a data processing system or a method for operating the memory system and the data processing system, which may easily manage a valid page count by reducing a valid page count of a memory block included in a memory device corresponding to a valid physical address transmitted from a host, or a valid storage element count of a memory block, when the physical address is valid, and thus improve efficiency of a background operation because it is possible to perform a garbage collection operation on a memory block having a valid page count less than a predetermined value, during a write operation performed in another memory block.

Various embodiments of the present invention are directed to a memory system, a data processing system or a method for driving the memory system and the data processing system, which may be provided by utilizing an interface between a host and the memory system without adding separate hardware configurations or resources and changing the interface when the memory system, not the host, has an authority for controlling a physical address inputted with a write request.

Various embodiments of the present invention are directed to a memory system, a data processing system or a method for driving the memory system and the data processing system, which may improve operational reliability of the data processing system including a host, which can be designed to directly control the memory system because the memory system may invalidate a physical address inputted with a write request from the host.

In accordance with an embodiment of the present invention, a memory system may comprises a memory device suitable for storing L2P map data including a logical address of an external device and a physical address of the memory device corresponding to the logical address; and a controller suitable for storing at least a portion of the L2P map data and state information of the L2P map data, and controlling data input/output of the memory device, wherein, when a write request including write data, a first logical address, and a first physical address are received from an external device, the controller may perform a write operation on a page in which data is not stored and is identified by a second physical address, and may invalidate the first physical address, and wherein the controller may transmit a first acknowledgement, which does not include the second physical address, to the external device, after completely performing the write operation.

When a read request including the first logical address is received from the external device after the write operation is performed, the controller may transmit the second physical address and a read data stored at the second physical address of the memory device to the external device. The controller may invalidate the first physical address by changing a value of state information corresponding to the first physical address. The state information may include invalid address information. The controller may invalidate the first physical address, and reduces a valid page count of a memory block corresponding to the invalidated first physical address. The controller may perform a garbage collection operation on a memory block having the valid page count less than a predetermined value. The controller may perform an erase operation on a memory block having the valid page count of 0. The controller may transmit the second physical address after a read request for the first logical address is received.

In accordance with an embodiment of the present invention, a method for controlling a memory system which may include a controller suitable for storing L2P map data including a logical address of an external device and a physical address of a memory device corresponding to the logical address, and state information of the L2P map data, the method comprising: receiving a write request including a first logical address and a first physical address corresponding to the first logical address from the external device; searching for a second physical address which is not mapped to a logical address; performing a write operation for the write request on a page corresponding to a found second physical address; invalidating the first physical address; and transmitting a first acknowledgement, which does not include the found second physical address, to the external device.

The method may further comprise transmitting data stored in a memory device corresponding to the found second physical address, and the found second physical address to the external device when a read request and the first logical address are received from the external device. The invalidating of the first physical address comprises changing a value of state information corresponding to the first physical address. The state information comprises invalid address information. The method may further comprise reducing a valid storage element count of a memory block corresponding to the first physical address after the invalidating of the first physical address. A garbage collection operation is performed on a memory block having the valid storage element count less than a predetermined value after the reducing of the valid storage element count. An erase operation is performed on a memory block having the valid storage element count of 0 after the reducing of the valid storage element count. The found second physical address is transmitted after a read request for the first logical address is received.

In accordance with an embodiment of the present invention, a data processing system may comprises a memory system that may include a controller suitable for storing data in a memory device; and a host that interworks with the memory system, the host stores at least a portion of map information used in the memory system, and may transmit the write request including a first logical address and a first physical address associated with the first logical address to the memory system by searching for the first physical address in the at least some of map information, wherein, when the first physical address is transmitted with the write request from the host, the memory system may perform a write operation on a page corresponding to a second physical address which is not assigned a logical address, and may invalidate the first physical address, and when a read request for the first logical address is received from the host, the memory system may transmit the second physical address in a response to the read request, to the host.

The memory system may invalidate the first physical address by changing a value of state information corresponding to the first physical address. The state information comprises invalid address information. The read request is a request for the host to access data corresponding to the first logical address stored in the memory system.

In accordance with an embodiment of the present invention, a data processing system may comprises a memory device for storing plural pieces of map data, each associating a logical address used by an external device with a physical address used by the memory system; and a controller for loading pieces of map data from the memory device, receiving a write request along with a piece of write data, which are inputted from the external device, and releasing a piece of map data relevant to a physical address in loaded pieces of map data based on whether the write request is inputted along with the physical address.

These and other features and advantages of the present invention are not limited to the embodiments described above, and will become apparent to those skilled in the art of the present invention from the following detailed description in conjunction with the accompanying drawings.

BRIEF DESCRIPTION OF THE DRAWINGS

FIG. 11 is a flowchart illustrating a method for performing a write operation by an external device illustrated in FIG. 7.

FIGS. 12A to 12C illustrate a structure of a write request transmitted to a memory system by an external device, illustrated in FIG. 7.

DETAILED DESCRIPTION

Figure 1:
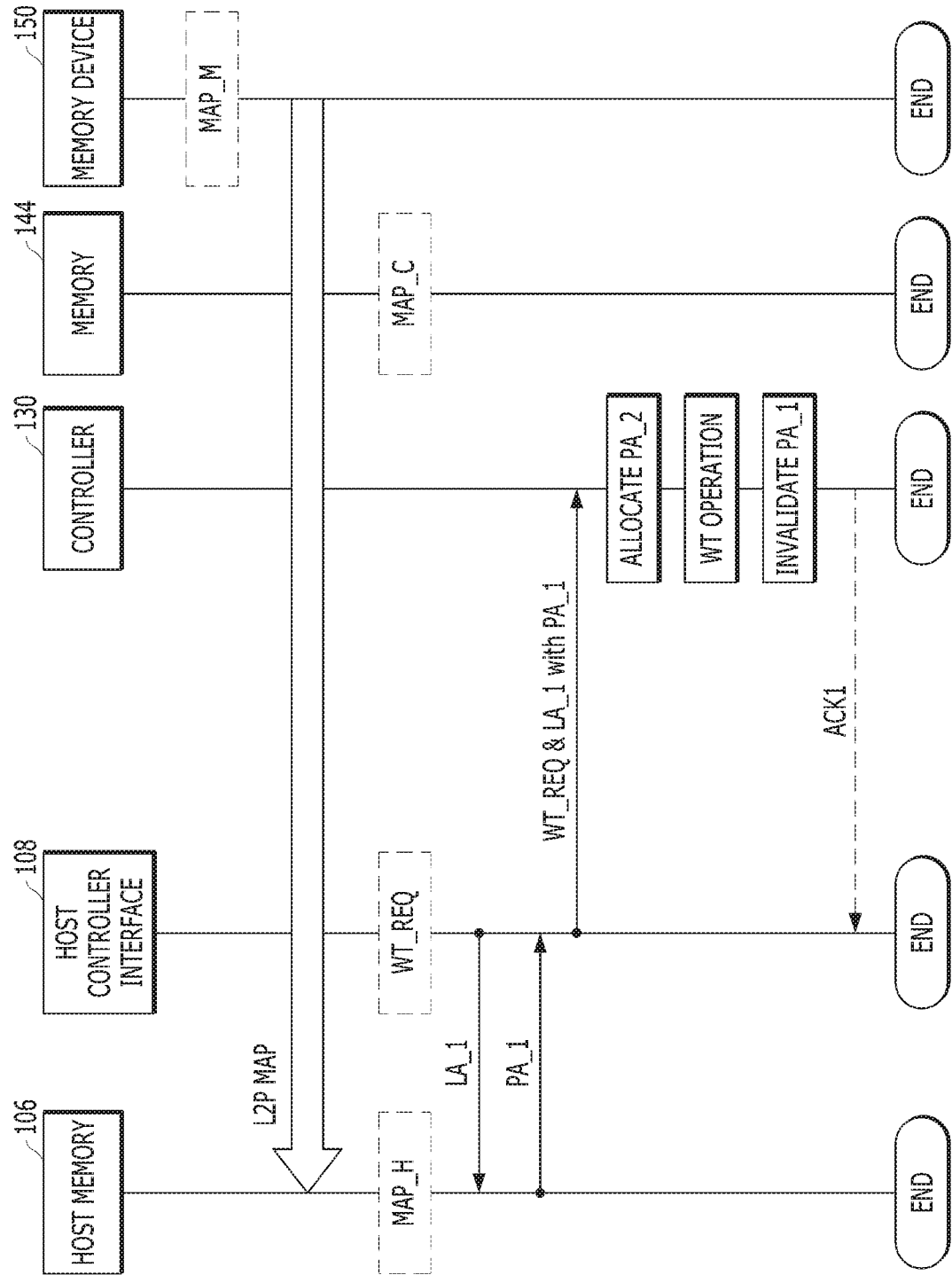
FIG. 1 is a block diagram illustrating a method for performing a command operation by a data processing system and a memory system in accordance with an embodiment.

Various embodiments of the disclosure are described below in more detail with reference to the drawings. Elements and features of the disclosure, however, may be configured or arranged differently to form other embodiments, which may be variations of any of the disclosed embodiments. Thus, the invention is not limited to the embodiments set forth herein. Rather, the described embodiments are provided so that this disclosure is thorough and complete, and fully conveys the scope of the disclosure to those skilled in the art to which this invention pertains. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art, and are not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, various embodiments of the present invention will be described below in detail with reference to the accompanying drawings. In the following description, only parts necessary for understanding the operation according to the present embodiments will be described, and the description of the other parts will be omitted so as not to obscure the concept and point of the present embodiments.

FIG. 1 is a block diagram illustrating a method for performing a command operation by a data processing system and a memory system in accordance with an embodiment.

Referring to FIG. 1, a data processing system includes a memory system including a memory device 150, a memory 144, and a controller 130, and a host including a host controller interface 108 and a host memory 106. The host may be an example of an external device interworking with the memory system.

The memory 144 shown in FIG. 1 may be a cache/buffer memory included in the controller 130 or a volatile memory associated with the controller 130. For convenience of description, the memory 144 is described in a configuration separate from the controller 130. However, the memory 144 may function as the cache/buffer memory of the controller 130 even if the memory 144 is located outside the controller 130.

When power is supplied to the host and the memory system (power-on), the host and the memory system may be interlocked to perform a map data initialization uploading operation. In this case, the controller 130 may load memory map data MAP_M (e.g., L2P MAP) stored in the memory device 150. The controller 130 may store the memory map data MAP_M in the memory 144 as a controller map data MAP_C. The controller 130 may transmit the controller map data MAP_C stored in the memory 144 to the host controller interface 108. The host controller interface 108 may store the controller map data MAP_C delivered from the controller 130 as a host map data MAP_H in the host memory 106. As described operation above, the map data initialization uploading operation may be completed, and a detailed description thereof will be provided below with reference to FIG. 6.

The host may generate a write request WT_REQ including a first logical address LA_1. The host controller interface 108 searches for a first physical address PA_1 corresponding to the first logical address LA_1 based on the host map data MAP_H stored in the host memory 106. Accordingly, the host controller interface 108 transmits the write request WT_REQ with the first logical address LA_1 and the first physical address PA_1.

When the write request WT_REQ with the first logical address LA_1 and the first physical address PA_1 is inputted, the controller 130 may allocate a second physical address PA_2, indicating a free space where any data is not stored or is not associated with any logical address. The controller 130 performs a write operation on a physical location indicated by the second physical address PA_2.

Thereafter, the controller 130 may change a value of state information regarding the first physical address and invalidate the first physical address PA_1 when the first physical address PA_1 is inputted with a read request from the host controller interface 108. The state information may include an indicator showing whether address information is valid. A detailed description thereof will be described with reference to FIGS. 9 to 13.

Figure 2:
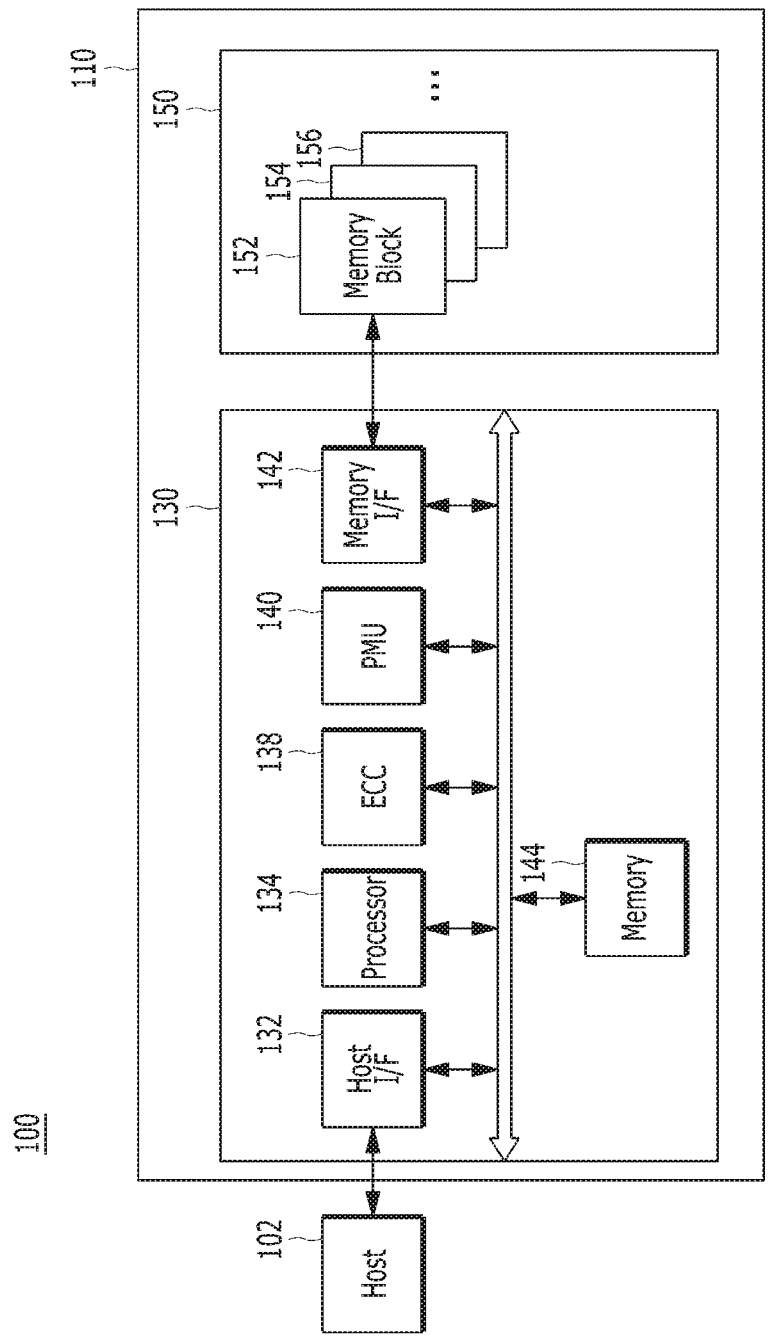
FIG. 2 is a schematic diagram illustrating a data processing system 100 in accordance with an embodiment.

FIG. 2 is a block diagram illustrating a data processing system 100 in accordance with an embodiment.

In FIG. 2, a data processing system 100 in accordance with an embodiment of the disclosure is described. Referring to FIG. 2, the data processing system 100 may include a host 102 engaged or interlocked with a memory system 110.

The host 102 may include, for example, a portable electronic device such as a mobile phone, an MP3 player and a laptop computer, or a non-portable electronic device such as a desktop computer, a game player, a television (TV), a projector and the like.

The host 102 also includes at least one operating system (OS), which can generally manage and control, functions and operations performed in the host 102. The OS can provide interoperability between the host 102 engaged with the memory system 110 and the user using the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described later, with reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be so integrated into an SSD to improve an operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMC-micro), a SD card (SD, miniSD, microSD, SDHC), a universal flash memory or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a memory device and may retain data stored therein even when an electrical power is not supplied. The memory device 150 may store data provided from the host 102 through a write operation, and provide data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, to the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE). In accordance with an embodiment, the host interface 132 is a component for exchanging data with the host 102, which may be implemented through a firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include any and all circuits, modules, systems or devices for performing the error correction operation based on at least one of the above described codes.

The PMU 140 may manage, control or provide an electrical power provided in the controller 130.

The memory interface 142 may serve as an interface for handling commands and data transferred between the controller 130 and the memory device 150, to correspond with the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data which occurs or is delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 2 exemplifies the second memory 144 is disposed within the controller 130, the embodiment is not limited thereto. That is, the memory 144 may be located within or external to the controller 130. For instance, the memory 144 may be embodied by an external volatile memory having a memory interface transferring data and/or signals between the memory 144 and the controller 130.

The memory 144 may store map data and state information. The map data may include L2P map data including L2P segments, each associating a logical address LA with a physical address PA. In addition, the map data may further include P2L map data composed of P2L segments, each associating a physical address PA with a logical address LA. The state information may indicate the states of pages, memory blocks, and stored data included in the memory device 150. In an embodiment, the state information may include invalid address information and the valid page number regarding a memory block. In an embodiment, the state information may have a bitmap structure. In this case, because the memory 144 stores a small amount of the state information, it is likely that the controller 130 can access or check the state information without a heavy burden. In addition, the state information can be generated, controlled, updated or managed in a map segment basis. In another embodiment, the state information may have a table structure or a list structure. The invalid address information may include a physical address indicating a page in which data has been invalid, i.e., used no longer. In an embodiment, when a write operation is performed, the invalid address information may include a physical address indicating a page where old write data previously stored becomes invalidated in response to the write operation. The invalid address information having a bit map structure may have an initial value for each page. The initial value may be updated to another value when a piece of data indicated by a physical address PA is invalid. The valid page number may indicate the number of valid pages included in a memory block. Herein, the valid page means a page storing a piece of data which is valid, i.e., accessed or read later.

The memory 144 can store data necessary for performing operations such as data writing and data reading requested by the host 102 and/or data transfer between the memory device 150 and the controller 130 for background operations such as garbage collection and wear levelling. Herein, the background operation may include an operation independently performed within the memory system, regardless of any request or any inquiry inputted from the host. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the H L.

The FTL may manage operations of address mapping, garbage collection, wear-leveling and the like. Particularly, the H L may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to an command inputted from the host 102, such as a program operation corresponding to a write request, a read operation corresponding to a read request, an erase/discard operation corresponding to an erase/discard command and a parameter set operation corresponding to a set parameter command or a set feature command with a set command. Herein, the foreground operation may include an operation performed within the memory system, which is performed in response to, or based at least on, a request, a command or an inquiry inputted from the host.

For another example, the controller 130 may perform a background operation on the memory device 150 through the processor 134. By way of example but not limitation, the background operation for the memory device 150 includes an operation of copying and storing data stored in a memory block among the memory blocks 152, 154, 156 in the memory device 150 to another memory block, e.g., a garbage collection (GC) operation. The background operation can include an operation of moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing a plurality of program operations corresponding to plural program commands, a plurality of read operations corresponding to plural read requests and a plurality of erase operations corresponding to plural erase commands sequentially, randomly or alternatively, the controller 130 can determine which channel(s) or way(s) among a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine the state of each channel or each way as a busy state, a ready state, an active state, an idle state, a normal state and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and the like. The controller 130 can refer to, or use, the descriptors to determine which channel(s) or way(s) an instruction or data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
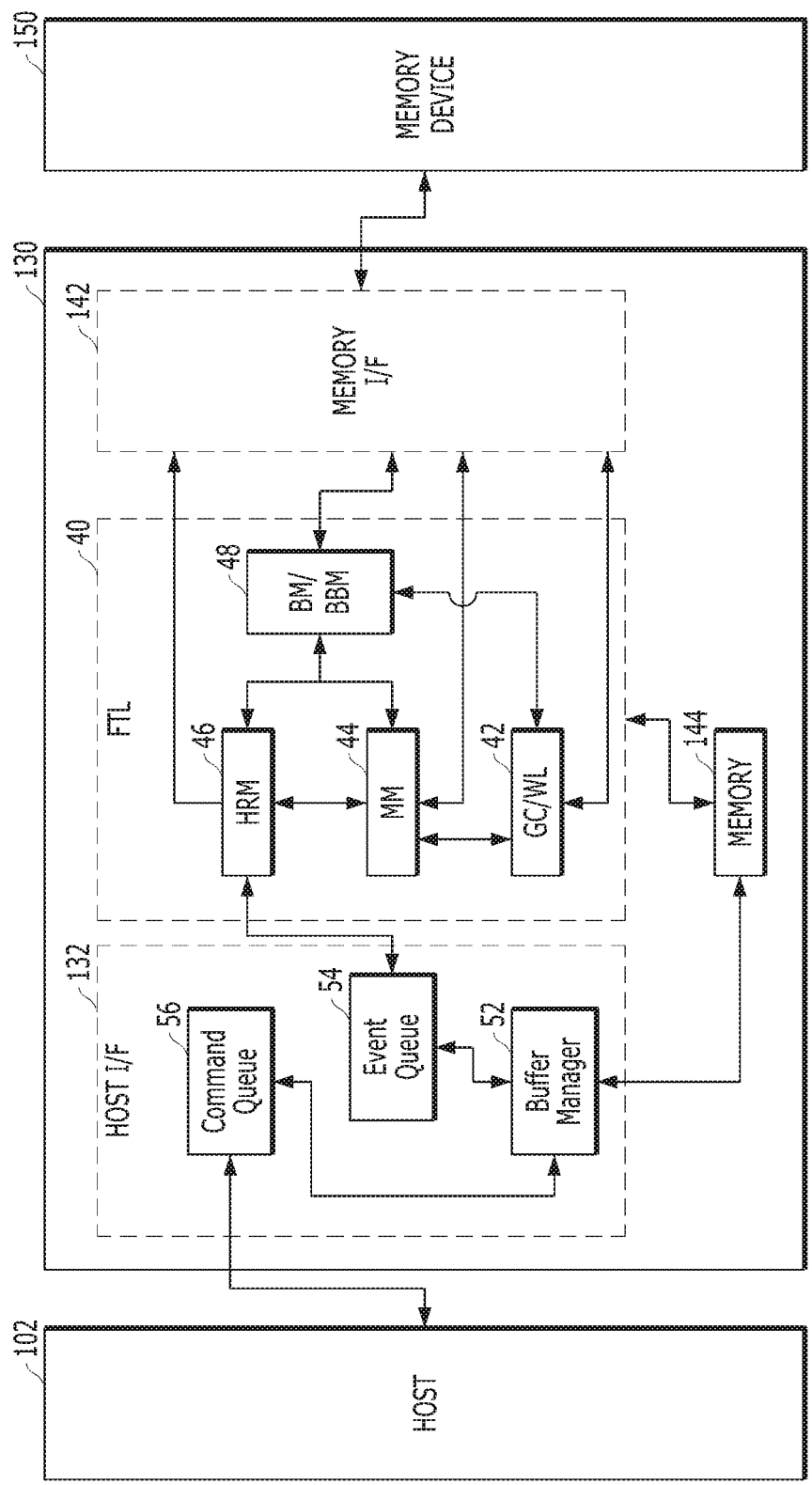
FIG. 3 is a schematic diagram illustrating a configuration of a memory device employed in the memory system of FIG. 2.

Referring to FIG. 3, a controller in a memory system in accordance with another embodiment of the disclosure is described in detail. The controller 130 cooperates with the host 102 and the memory device 150. As illustrated, the controller 130 includes a host interface 132, a flash translation layer (FTL) 40, as well as the host interface 132, the memory interface 142 and the memory 144 previously identified in connection with FIG. 2.

Although not shown in FIG. 3, in accordance with an embodiment, the ECC unit 138 described in FIG. 2 may be included in the flash translation layer (FTL) 40. In another embodiment, the ECC unit 138 may be implemented as a separate module, a circuit, firmware or the like, which is included in, or associated with, the controller 130.

The host interface 132 is for handling commands, data, and the like transmitted from the host 102. By way of example but not limitation, the host interface 132 may include a command queue 56, a buffer manager 52 and an event queue 54. The command queue 56 may sequentially store commands, data, and the like received from the host 102 and output them to the buffer manager 52 in an order in which they are stored. The buffer manager 52 may classify, manage or adjust the commands, the data, and the like, which are received from the command queue 56. The event queue 54 may sequentially transmit events for processing the commands, the data, and the like received from the buffer manager 52.

A plurality of commands or data of the same characteristic, e.g., read or write requests, may be transmitted from the host 102, or commands and data of different characteristics may be transmitted to the memory system 110 after being mixed or jumbled by the host 102. For example, a plurality of commands for reading data (read requests) may be delivered, or commands for reading data (read request) and programming/writing data (write request) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the characteristics of commands, data, and the like, which have been entered from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 40. The event queue 54 receives events, entered from the buffer manager 52, which are to be internally executed and processed by the memory system 110 or the controller 130 in response to the commands, the data, and the like transmitted from the host 102, so as to deliver the events into the flash translation layer (FTL) 40 in the order received.

In accordance with an embodiment, the flash translation layer (FTL) 40 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection or wear leveling. The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map data manager (MM) 44, to determine a physical address corresponding to the logical address which is entered with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page (no data) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 may not perform the mapping table update. It is because the map request is issued with old physical information if the status manger 42 requests a map update and a valid page copy is completed later. The map manager 44 may perform a map update operation to ensure accuracy only if the latest map table still points to the old physical address.

In accordance with an embodiment, at least one of the state manager 42, the map manager 44 or the block manager 48 can include at least one circuitry for performing its own operation. As used in the disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processors)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to any and all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

The memory device 150 can include a plurality of memory blocks. The plurality of memory blocks can be any of different types of memory blocks such as a single level cell (SLC) memory block, a multi level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in a view of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory and the like. Alternatively, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 4:
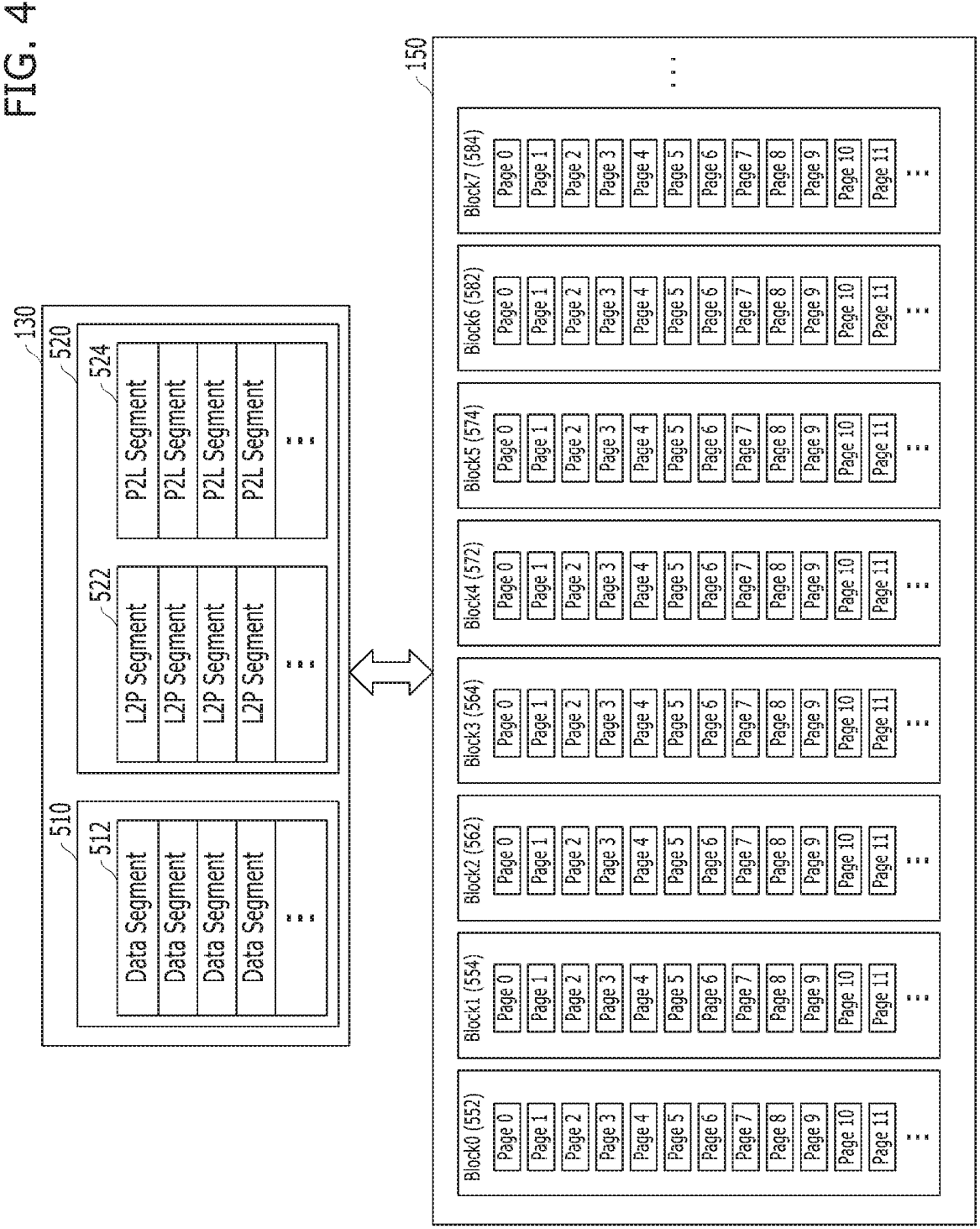
FIG. 4 is a schematic diagram which describes a data processing operation with respect to a memory device in a memory system in accordance with an embodiment.

FIG. 4 is a schematic diagram which describes a data processing operation with respect to a memory device in a memory system in accordance with an embodiment.

Referring to FIG. 4, the controller 130 may perform a command operation corresponding to a command received from the host 102, for example, a program operation corresponding to a write request. At this time, the controller 130 may write and store plural pieces of user data corresponding to the write request, in memory blocks 552, 554, 562, 564, 572, 574, 582, 584 in the memory device 150. Also, corresponding to the write operation to the memory blocks 552, 554, 562, 564, 572, 574, 582, 584, the controller 130 may generate and update metadata for the user data, and write and store the metadata in the memory blocks 552, 554, 562, 564, 572, 574, 582, 584 of the memory device 150.

The controller 130 may generate and update information indicating that the user data are stored in the pages included in the memory blocks 552, 554, 562, 564, 572, 574, 582, 584 of the memory device 150, for example, first map data and second map data, that is, generate and update the logical segments, that is, L2P segments, of the first map data and the physical segments, that is, P2L segments, of the second map data, and then, stores the L2P segments and the P2L segments in the pages included the memory blocks 552, 554, 562, 564, 572, 574, 582, 584 of the memory device 150, by performing a map flush operation.

For example, the controller 130 may cache and buffer the user data corresponding to the write request received from the host 102, in a first buffer 510 included in the memory 144 of the controller 130, that is, store data segments 512 of the user data in the first buffer 510 as a data buffer/cache. Then, the controller 130 may write and store the data segments 512 stored in the first buffer 510, in the pages included in the memory blocks 552, 554, 562, 564, 572, 574, 582, 584 of the memory device 150.

As the data segments 512 of the user data corresponding to the write request received from the host 102 are written and stored in the pages included in the memory blocks 552, 554, 562, 564, 572, 574, 582, 584 of the memory device 150, the controller 130 may generate the first map data and the second map data, and store the first map data and the second map data in a second buffer 520 included in the memory 144 of the controller 130. Specifically, the controller 130 may store L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data, or there may be stored a map list for the L2P segments 522 of the first map data and a map list for the P2L segments 524 of the second map data. The controller 130 may write and store the L2P segments 522 of the first map data and the P2L segments 524 of the second map data which are stored in the second buffer 520, in the pages included in the memory blocks 552, 554, 562, 564, 572, 574, 582, 584 of the memory device 150.

Also, the controller 130 may perform a command operation corresponding to a command received from the host 102, for example, a read operation corresponding to a read request. At this time, the controller 130 may load user data corresponding to the read request, for example, L2P segments 522 of first map data and P2L segments 524 of second map data, in the second buffer 520, and check the L2P segments 522 and the P2L segments 524. After that, the controller 130 may read the user data stored in the pages included in corresponding memory blocks among the memory blocks 552, 554, 562, 564, 572, 574, 582, 584 of the memory device 150, store data segments 512 of the read user data in the first buffer 510, and provide the data segments 512 to the host 102.

Figure 5:
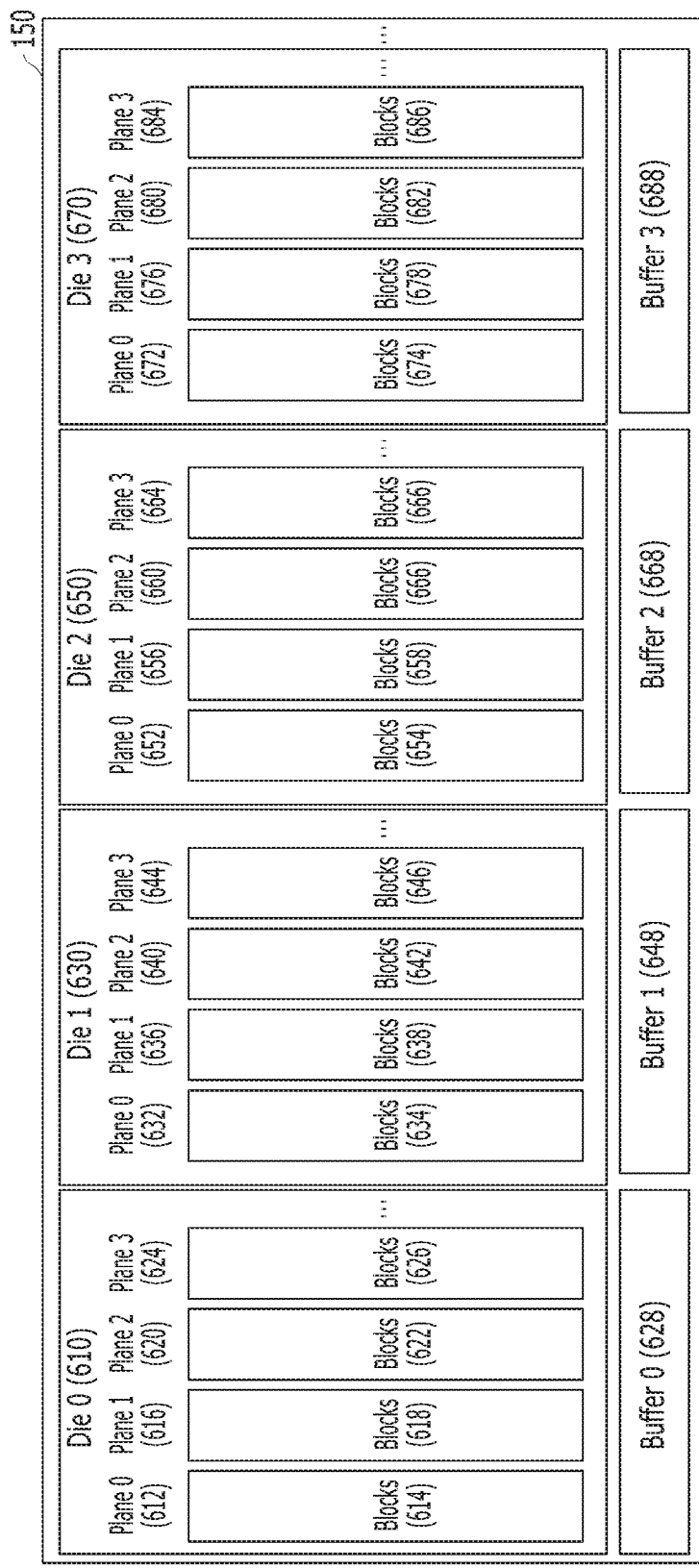
FIG. 5 is a schematic diagram illustrating a memory device in accordance with an embodiment.

Referring to FIG. 5, the memory device 150 may include a plurality of memory dies, for example, a first memory die 610, a second memory die 630, a third memory die 650 and a fourth memory die 670. Each of the memory dies 610, 630, 650, 670 may include a plurality of planes. For example, the first memory die 610 may include a first plane 612, a second plane 616, a third plane 620 and a fourth plane 624. The second memory die 630 may include a first plane 632, a second plane 636, a third plane 640 and a fourth plane 644. The third memory die 650 may include a first plane 652, a second plane 656, a third plane 660 and a fourth plane 664, and the fourth memory die 670 may include a first plane 672, a second plane 676, a third plane 680 and a fourth plane 684. The respective planes 612, 616, 620, 624, 632, 636, 640, 644, 652, 656, 660, 664, 672, 676, 680, 684 in the memory dies 610, 630, 650, 670 included in the memory device 150 may include a plurality of memory blocks 614, 618, 622, 626, 634, 638, 642, 646, 654, 658, 662, 666, 674, 678, 682, 686, for example, N number of blocks Block0, Block1, ..., BlockN−1. Each block may include a plurality of pages, for example, 2^M number of pages, as described above with reference to FIG. 2. The plurality of memory dies of the memory device 150 may be coupled to the same channels. For example, the memory die 0610 and the memory die 2650 may be coupled to a channel 0602, and the memory die 1630 and the memory die 3670 may be coupled to a channel 1604.

In the embodiment of the present disclosure, in consideration of program sizes in the memory blocks 614, 618, 622, 626, 634, 638, 642, 646, 654, 658, 662, 666, 674, 678, 682, 686 of the respective planes 612, 616, 620, 624, 632, 636, 640, 644, 652, 656, 660, 664, 672, 676, 680, 684 included in the respective memory dies 610, 630, 650, 670 of the memory device 150 as described above with reference to FIG. 5, user data and metadata of a command operation corresponding to a command received from the host 102 may be written and stored in the pages included in the respective memory blocks 614, 618, 622, 626, 634, 638, 642, 646, 654, 658, 662, 666, 674, 678, 682, 686. In particular, after grouping the memory blocks 614, 618, 622, 626, 634, 638, 642, 646, 654, 658, 662, 666, 674, 678, 682, 686 into a plurality of super memory blocks, user data and metadata of a command operation corresponding to a command received from the host 102 may be written and stored in the plurality of super memory blocks, for example, through a one shot program.

Each of the plurality of super memory blocks may include a plurality of memory blocks, for example, at least one memory block included in a first memory block group and at least one memory block included in a second memory block group. The first memory block group and the second memory block group may be different memory dies coupled to different channels. Further, a plurality of memory blocks, for example, a first memory block and a second memory block, in a first memory block group coupled to a first channel may be memory blocks in memory dies coupled to different ways of a channel, and a plurality of memory blocks, for example, a third memory block and a fourth memory block, in a second memory block group coupled to a second channel may be memory blocks in memory dies coupled to different ways of a channel.

For example, a random first super memory block may include a first memory block included in a first memory die coupled to a first channel, a second memory block included in a second memory die coupled to a second channel, a third memory block included in a third memory die coupled to the first channel, and a fourth memory block included in a fourth memory die coupled to the second channel. While it is described in an embodiment of the present disclosure, that one super memory block includes 4 memory blocks, it is to be noted that one super memory block may include only a first memory block included in a first memory die coupled to a first channel and a second memory block included in a second memory die coupled to a second channel, that is, only 2 memory blocks.

In an embodiment of the present disclosure, in a case of performing a program operation in the super memory blocks included in the memory device 150, data segments of user data and meta segments of metadata for the user data may be stored in the plurality of memory blocks included in the respective super memory blocks, through an interleaving scheme, in particular, a channel interleaving scheme and a memory die interleaving scheme or a memory chip interleaving scheme. To this end, the memory blocks included in the respective super memory blocks may include memory blocks included in different memory dies, e.g., memory blocks of different memory dies coupled to different channels.

Moreover, in an embodiment of the present disclosure, in the case where, as described above, a random first super memory block may include 4 memory blocks included in 4 memory dies coupled to 2 channels, in order to ensure that a program operation is performed through a channel interleaving scheme and a memory die interleaving scheme, the first page of the first super memory block corresponds to the first page of a first memory block, the second page next to the first page of the first super memory block corresponds to the first page of a second memory block, the third page next to the second page of the first super memory block corresponds to the first page of a third memory block, and the fourth page next to the third page of the first super memory block corresponds to the first page of a fourth memory block. In an embodiment of the present disclosure, the program operation may be performed sequentially from the first page of the first super memory block. Hereinbelow, detailed descriptions will be made by taking an example with reference to FIG. 7, for an operation of performing a program operation for a super memory block included in the memory device 150 in a memory system according to an embodiment, for example, an operation of storing segments of user data and metadata corresponding to a write request received from the host 102.

Figure 6:
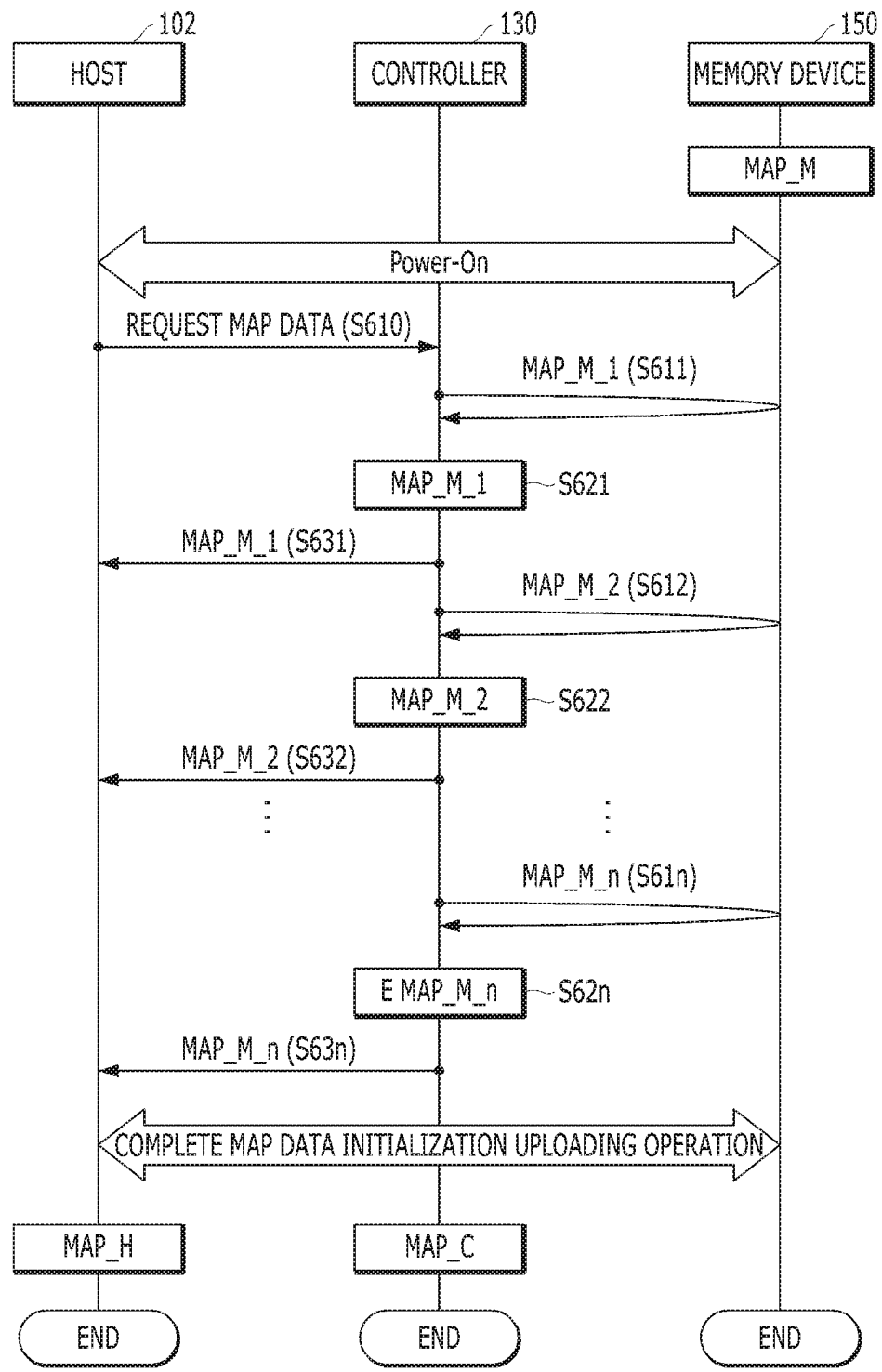
FIG. 6 is a flowchart illustrating a process of initially uploading map data.

FIG. 6 is a flowchart illustrating a method in which the memory system 110 sends all or a portion of the memory map data MAP_M to the host 102 after power-on. Referring to 6, the controller 130 loads some or all of a memory map data MAP_M stored in the memory device 150 and transmits loaded memory map data MAP_M to the host 102 after power-on. After power-on, the host 102, the controller 130, and the memory device 150 may start an initialization uploading operation of a map data.

In step S610, the host 102 may request a map data to the controller 130. For example, the host 102 may designate and request a specific portion of the map data. For example, the host 102 may designate and request a portion of the map data, in which data needed to drive the data processing system 100, such as a file system, a boot image, and an operating system, is stored. As another example, the host 102 may request the map data to the controller 130 without any designation.

In step S611, the controller 130 may read a first portion MAP_M_1 of the memory map data MAP_M from the memory device 150. In step S621, the first portion MAP_M_1 may be stored in the controller 130 as the controller map data MAP_C. In step S631, the controller 130 may send the first portion MAP_M_1, which has been stored as the controller map data MAP_C, to the host 102. The first portion MAP_M_1 may be stored in the host memory 106 as the host map data MAP_H.

In step S612, the controller 130 may read a second portion MAP_M_2 of the memory map data MAP_M from the memory device 150. In step S622, the second portion MAP_M_2 may be stored in the controller 130 as the controller map data MAP_C. In step S632, the controller 130 may send the second portion which has been stored as the controller map data MAP_C, to the host 102. The second portion MAP_M_2 may be stored in the host memory 106 as the host map data MAP_H, by the host 102.

In step S61n, the controller 130 may read an $n^{th}$ portion MAP_M_n of the memory map data MAP_M from the memory device 150. In step S62n, the $n^{th}$ portion MAP_M_n may be stored in the controller 130 as the controller map data MAP_C. In step S63n, the controller 130 may send the $n^{th}$ portion MAP_M_n, which has been stored as the controller map data MAP_C, to the host 102. The $n^{th}$ portion MAP_M_n may be stored in the host memory 106 as the host map data MAP_H, by the host 102. Consequently, the host 102, the controller 130, and the memory device 150 may complete an initialization uploading operation of the map data.

The controller 130 in FIG. 6 may load a part of the memory map data MAP_M from the memory device 150 a plurality of times and may upload the loaded memory map data MAP_M to the host 102 a plurality of times in response to a single request of map data, which is inputted from the host 102 in step S610. In an embodiment, the controller 130 may upload all of the memory map data MAP_M to the host 102 in response to a single request of map data received from the host 102. In another embodiment, the controller 130 may upload a part of the memory map data MAP_M to the host 102 a plurality of times in response to a plurality of requests for the map data, which are inputted from the host 102.

As described above, the controller map data MAP_C can be stored in the memory 144 of the controller 130, and the host map data MAP_H can be stored in the host memory 106 of the host 102.

If the initialization uploading operation for the map data is completed, the host 102 may interwork with the memory system 110 and start to access data stored in the memory system 110. By way of example but not limitation, an embodiment illustrated in FIG. 6 shows that the host 102 and the memory system 110 can perform the initialization uploading operation. In another embodiment, the initialization uploading operation may be omitted. The host 102 may perform an operation for accessing data stored in the memory system 110 without the initialization uploading operation.

After the initial uploading operation for the map data, the memory map data MAP_M may be updated and stored in the memory device 150 in response to a host request or under the control of the controller 130 without a host request. The memory map data MAP_M may be updated and stored in the memory device 150 in part or in whole, and periodically or on an event basis.

Figure 7:
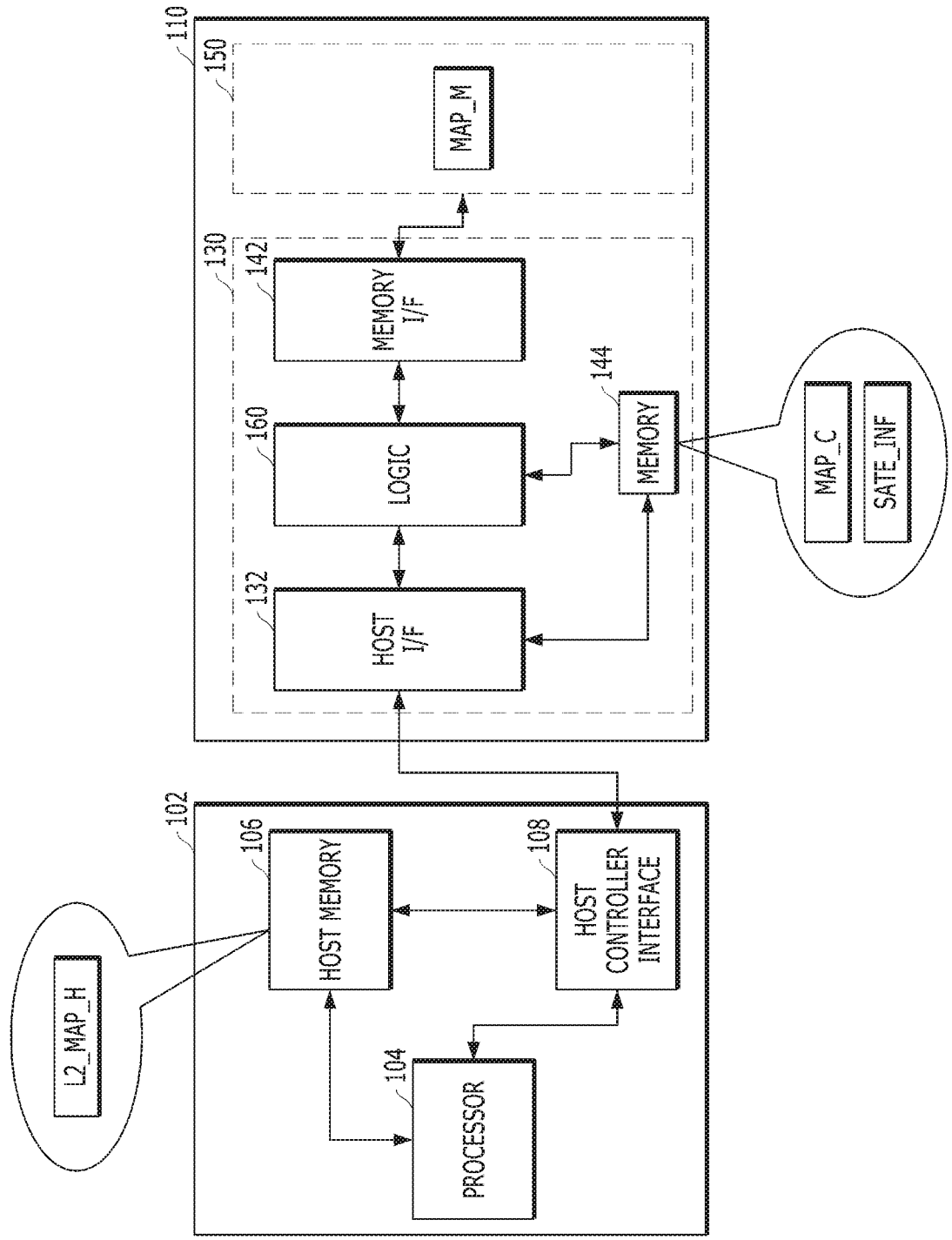
FIG. 7 is a block diagram illustrating a data processing system including a memory system in accordance with an embodiment.

FIG. 7 illustrates an example of a data processing system including a memory system 110 and a host 102 illustrated in FIGS. 1 and 6 in accordance with an embodiment. The memory system 110 according to the embodiment includes a memory device 150 including a plurality of memory blocks and a controller 130 for controlling the memory device 150.

As illustrated in FIG. 7, a host memory 106 in the host 102 may store host map data MAP_H. The host map data includes L2P map data L2P_MAP_H having plural L2P segments, which associate logical addresses with physical addresses.

A memory 144 in the controller 130 may store controller map data MAP_C and state information STATE_INF. The controller map data MAP_C may include L2P map data L2P_MAP_C having plural L2P segments, which associate logical addresses with physical addresses According to an embodiment, the controller map data MAP_C may further include P2L map data P2L_MAP_C having plural P2L segments, which associate physical addresses PA with logical addresses LA. A process of transmitting the map data to the host 102 from the memory system 110 according to the embodiment may include uploading the L2P controller map data L2P_MAP_C to the host 102 by the memory system 110, in order to update the host map data MAP_H which has been stored in the host memory 106.

In addition, the memory 144 in the controller 130 may store the state information STATE_INF. The state information STATE_INF may indicate states of pages, memory blocks, and pieces of data included in the memory device 150. In an embodiment of the present invention, the state information STATE_INF may include invalid address information INVALID_INF and the valid page number VPC. The state information STATE_INF may have a bitmap structure. In this case, because the memory 144 stores a small amount of the state information, it is likely that the controller 130 can access or check the state information STATE_INF without a heavy burden. In addition, the state information STATE_INF can be generated, controlled, updated or managed in a map segment basis. In another embodiment, the state information STATE_INF may have a table structure or a list structure. The invalid address information INVALID_INF may include a physical address indicating a page in which data has been invalid, i.e., no longer used. In an embodiment, when a write operation is performed, the invalid address information INVALID_INF may include a physical address indicating a page where old write data previously stored becomes invalidated in response to the write operation. The invalid address information INVALID_INF having a bit map structure may have an initial value for each page. The initial value (e.g., '0') may be updated to another value when a piece of data indicated by a physical address PA is invalid. In an embodiment, the invalid address information INVALID_INF may be included in the map data. The valid page number VPC may indicate the number of valid pages included in a memory group, e.g., a memory block.

Figure 8:
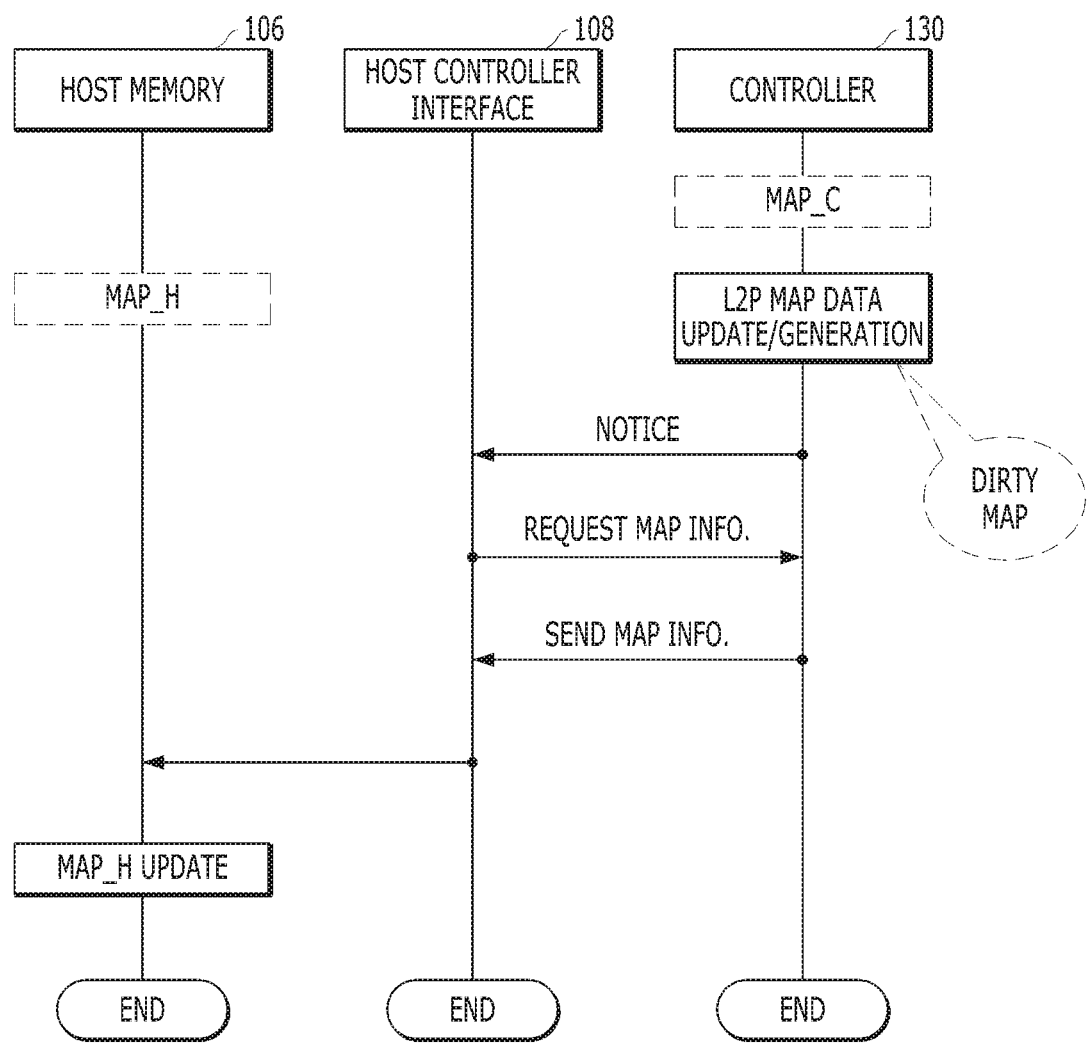
FIG. 8 is a flowchart illustrating an example of a data processing system including a memory system in accordance with an embodiment.

FIG. 8 illustrates an example of the map update operation performed by the data processing system illustrated in FIG. 7. Particularly, FIG. 8 illustrates a process of periodically uploading a part and all of memory map data MAP_M to the host 102 to upgrade or change the host map data MAP_H, which has been stored in the host memory 106, under the control of the controller 130.

The memory system 110 interworking with the host 102 may perform a read operation, an erase operation or a write operation relevant to data, which is requested from the host 102. After performing the read, erase or write operation requested from the host 102, the memory system 110 may update the metadata when a physical location or a physical address of the memory device 150 for a piece of data or a logical address is changed.

The memory system 110 may update the metadata in response to the change of the physical location in the memory device 150 for the piece of data in a process of performing a background operation, for example, a garbage collection operation or a wear-leveling operation, even without a request from the host 102. The controller 130 included in the memory system 110 may detect whether the metadata is updated through the above-described operation. In other words, the controller 130 may check that the metadata becomes dirty (i.e., dirty map) while the metadata is generated, updated, and erased. The controller 130 may reflect the dirty map in dirty information.

When it is recognized that the metadata becomes dirty, the controller 130 transmits a notice, informing a host controller interface 108 of the need to update the host map data MAP_H, to the host controller interface 108. According to an embodiment, the notice may be transmitted at regular time intervals or transmitted according to how much the metadata gets dirty.

In response to the notice inputted from the controller 130, the host controller interface 108 may transmit a request for the host map data MAP_H that needs to be updated, to the controller 130 (i.e., request map information). According to an embodiment, the host controller interface 108 may either request only a updated part of the host map data MAP_H or request all of the host map data MAP_H.

The controller 130 may transmit the metadata in response to the request of the host controller interface 108 for updating the host map data MAP_H (i.e., send map information). The host controller interface 108 may store the transmitted metadata to the host memory 106 to update the stored host map data MAP_H (i.e., L2P map update).

The memory map data MAP_M stored in the memory device 150 may include information for mapping the logical address LA and the physical address PA for a nonvolatile memory element (e.g., a cell or a page) included in the memory device 150. The memory map data MAP_M may be managed in a map segment MS basis. Each of the map segments MS may include a plurality of entries, and each entry may include information for mapping some consecutive logical addresses LA and some physical addresses PA.

Offsets may be assigned to the map segments MS. For example, offsets 01 to 12 may be assigned according to the logical address LA or the physical address PA mapped to each map segment MS, according to the physical address PA of the memory device 150 in which each map segment MS is stored. For example, the physical addresses PA of the memory device 150 or the logical addresses LA assigned to the memory device 150 may be divided at regular intervals, and mapping information associated with each of the divided groups may form each map segment MS. The controller 130 may read the memory map data MAP_M in a map segment basis MS from the memory device 150, and store the read memory map data MAP_M as the controller map data MAP_C.

Figure 9:
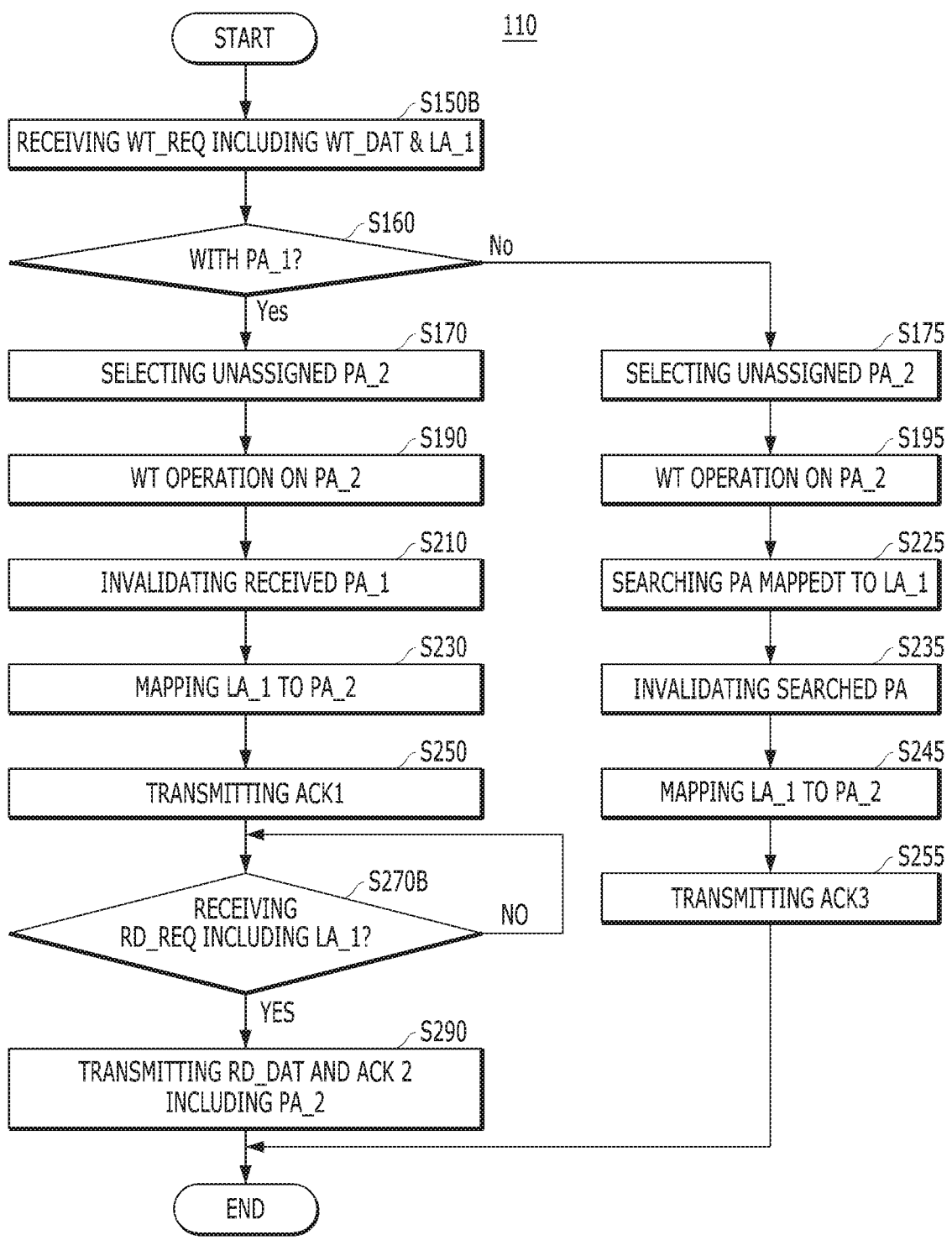
FIG. 9 is a flowchart illustrating a method for performing a write operation by a memory system illustrated in FIG. 7.
Figures 10A, 10B:
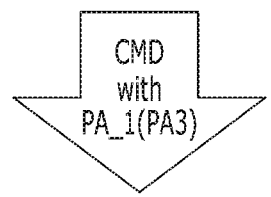
FIGS. 10A to 10C are tables illustrating an example of state information in accordance with an embodiment.
Figure 10C:
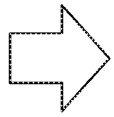

FIG. 9 is a flowchart illustrating a method for performing a write operation by a memory system illustrated in FIG. 7. FIGS. 10A to 10C illustrate an example of the state information STATE_INF according to an embodiment. FIG. 10A illustrates an example of the invalid address information INVALID_INF managed in bitmap.

Hereinafter, referring to FIGS. 7, 9 and 10A to 10C, an example of the write operation performed by the memory system 110 according to an embodiment will be described.

Referring to FIG. 9, the memory system 110 may receive a write request WT_REQ including write data WT_DAT and a first logical address LA_1 relating to the write data WT_DAT from the host 102 in step S150B. The memory system 110 determines whether a first physical address PA_1 is inputted together with the write request WT_REQ in step S160. When the first physical address PA_1 is inputted with the write request WT_REQ (Yes in step S160), the memory system 110 determines that the received write data WT_DAT is a type of updated write data which is written for changing or replacing a piece of data stored in the memory system 110.

Before step S160, the memory system 110 has stored old write data corresponding to the first logical address LA_1. Then, the memory system 110 has associated the first logical address LA_1 of the old write data with the first physical address PA_1 indicating a physical location in the memory device 150 to generate map information for the first logical address LA_1 before step S160. The map information includes the first logical address LA_1 and the first physical address PA_1. After the host 102 has received the map information delivered from the memory system 110, the host 102 can transmit the first physical address PA_1 together with the write request WT_REQ to the memory system 110 in step S160. To change the old write data which already stored in the memory device 150 with the write data WT_DAT, the host 102 transmits the write request WT_REQ to the memory system 110 in step S160. Then, the memory system 110 performs the following steps S170 to S230 in response to the write request WT_REQ.

In step S170, the memory system 110 selects a second physical address PA_2 which is in an unassigned state where a logical address is not assigned. The unassigned state includes a state in which data is not written. For example, the second physical address PA_2 may be a physical address of an erase page that is physically consecutive to a program page included in an open block. In addition, the second physical address PA_2 may be a first page included in a free block in which data is not to be written.

In the description of the embodiment, a page may include a plurality of memory cells coupled to a word line, and a memory block may include a plurality of pages. A plurality of memory blocks may be classified as an open block, a free block and a close block according to a state of data stored in the included pages. The free block is a memory block composed only of erase pages, and the close block is a memory block composed only of program pages. The open block may include at least one erase page and at least one program page.

In step S190, the memory system 110 performs the write operation for the write data WT_DAT inputted from the host 102, a page identified by the second physical address PA_2. When a size of the write data WT_DAT is larger than a storage capacity of one page, the memory system 110 may sequentially perform the write operation on a plurality of pages. In step S190, the memory system 110 associates the first logical address LA_1 inputted from the host 102 with the second physical address PA_2 or a plurality of second physical addresses PA_2 on which the write operation has been performed. According to an embodiment, mapping information or a mapping table may have one of various structures for associating the logical address with the physical address, according to a size of data. For example, when a size of a piece of data indicated by a single logical address is 512 bytes and a size of a single page in a memory device is 2 KB or 4 KB, the single logical address may be associated with plural physical addresses indicating a plurality of pages.

In step S210, the memory system 110 invalidates the first physical address PA_1 storing the old write data. The invalidation of the first physical address PA_1 is performed by releasing a corresponding relationship between the first physical address PA_1 and the first logical address LA_1 in the map data. The old write data stored in the memory device may be invalidated through the invalidation of the first physical address PA_1.

As described above, the memory system 110 according to an embodiment receives the first physical address PA_1 corresponding to the first logical address LA_1. Accordingly, the memory system 110 does not need to search for a physical address corresponding to the first logical address LA_1 in the L2P controller map data L2P_MAP_C stored in the memory 144, since the memory system 110 according to the present embodiment directly invalidates the first physical address PA_1 without a separate map searching process. Accordingly, the speed of the invalidation operation for the first physical address PA_1 may be improved, and thus the speed of the write operation may be also improved.

In addition, in step S210, the memory system 110 may change a state value of state information for invalidating the first physical address PA_1. A process of invalidating the first physical address PA_1 will be described in detail with reference to FIGS. 10A to 10C.

FIGS. 10A and 10B illustrate an example of the invalid address information INVALID_INF managed in a bitmap structure. Physical addresses PA0 to PA2, PA4 to PA6, PA8, PA9 in FIGS. 10A and 10B are a type of invalid physical addresses and have a state value of "1". Physical addresses PA3, PA7 are valid physical addresses and have a state value of "0". At this time, assuming that the first physical address PA_1 received with the first logical address LA_1 from the host 102 is "PA3", the memory system 110 changes a state value of "PA3" from "0" to "1" in the invalid address information INVALID_INF in order to invalidate the first physical address PA_1. As a result, the valid physical address "PA3" becomes the invalid physical address. Thus, the present embodiment may provide an effect of increasing efficiency of managing invalid data.

After performing step S210, the memory system 110 may control or reduce a valid page count VPC of the memory block associated with the first physical address PA_1 invalidated as shown in FIG. 10C.

Referring to FIG. 10C, when the invalidated first physical address PA_1 is one of physical addresses indicating pages included in a fourth memory block BLK3, the memory system 110 may invalidate the first physical address PA_1 in step S210, and then change the valid page count VPC included in the fourth memory block BLK3 from "16" to "15".

Although it is described in the embodiment for convenience in description that the first physical address PA_1 received from the host 102 is a physical address PA corresponding to a single page, the invention is not limited thereto. When the first physical address PA_1 inputted from the host 102 is a type of physical address PA corresponding to five pages, the controller 130 may invalidate the first physical address PA_1 inputted together with the write request WT_REQ, and then change the valid page count VPC, included in the fourth memory block BLK3 including the five pages, from "16" to "11". When two pages among the five pages are included in a first memory block BLK0, and the other three pages are included in a second memory block BLK1, the controller 130 may change the valid page count VPC for the first memory block BLK0 from "10" to "8", and change the valid page count VPC for the second memory block BLK1 from "15" to "12". The memory system 110 according to the embodiment may perform the garbage collection operation on a memory block having a valid page count VPC less than a predetermined value.

When the invalidated first physical address PA_1 is one of physical addresses for pages included in an eighth memory block BLK7, the memory system 110 may invalidate the first physical address PA_1 in step S210, and then change the valid page count VPC corresponding to the eighth memory block BLK7 from "1" to "0". Thus, because the eighth memory block BLK7 does not include any valid page, the memory system 110 may perform the erase operation on the eighth memory block BLK7.

Thereafter, the memory system 110 may perform the garbage collection (GC) operation on a memory block having a valid page count VPC less than a predetermined value, thereby improving efficiency of the background operation. In addition, the memory system 110 may generate a free block by performing the erase operation on a memory block having a valid page count VPC of "0", thereby increasing utilization of the memory device.

Referring back to FIG. 9, in step S230, the memory system 110 may map the first logical address LA_1 to one or more second physical addresses PA_2 on which the write operation has been performed in step S190.

Subsequently, in step S250, the memory system 110 may transmit a first acknowledgement ACK1 including a message indicating that the write operation has been completely performed, to the host 102. In an embodiment, the first acknowledgement ACK1 may further include a message indicating that the first physical address PA_1 received from the host 102 has been invalidated. The first acknowledgement ACK1 does not include the second physical addresses PA_2 that used when the write operation is performed in step S190 and mapped to the first logical address LA_1 in step S230.

Subsequently, the memory system 110 determines whether a read request RD_REQ with the first logical address LA_1 is received from the host 102, in step S270B. The first logical address LA_1 received in step S270B is the same logical address as the first logical address LA_1 received in step S150B.

When the read request RD_REQ including the first logical address LA_1 is inputted from the host 102 (Yes in S270B), the memory system 110 may determine that read data RD_DAT corresponding to the first logical address LA_1 is a type of hot data frequently requested to be accessed (for example, read) by the host 102. In this case, the read data RD_DAT is the same as the write data WT_DAT received from the host 102 in step S150B, and is stored in the second physical address PA_2 by the write operation of step S210.

In step S290, the memory system 110 may transmit the read data RD_DAT and a second acknowledgement ACK2 including the second physical address PA_2 to the host 102. The second acknowledgement ACK2 may include map information of the first logical address LA_1. The map information may include L2P controller map data L2P_MAP_C including the first logical address LA_1 and the second physical address PA_2 mapped to the first logical address LA_1. The second acknowledgement ACK2 may further include a message that the first physical address PA_1 is invalidated.

When the first physical address PA_1 is not inputted with the write request WT_REQ from the host 102 (No in S160), the memory system 110 determines that the received write data WT_DAT is a type of new write data. The new write data is the first data corresponding to the first logical address LA_1, which is first inputted regarding the first logical address LA_1. Therefore, the memory system 110 has not performed a write operation of the new write data and does not store map data corresponding to the first logical address LA_1 before the write request WT_REQ is inputted.

When the write data WT_DAT is a type of the new write data, the memory system 110 selects a second physical address PA_2 which is in an unassigned state where a logical address is not assigned. The memory system 110 performs the write operation of the write data WT_DAT on the second physical address PA_2. The memory system 110 may generate the map data by mapping the first logical address LA_1 to the second physical addresses PA_2 on which the write operation has been performed. The memory system 110 may transmit a third acknowledgement ACK3 including a message indicating that the write operation has been completely performed, to the host 102.

When the write data WT_DAT is the updated write data, the memory system 110 performs the following steps S175 to S255 in response to the write request WT_REQ.

In step S175, the memory system 110 selects a second physical address PA_2 which is in an unassigned state where a logical address is not assigned.

In step S195, the memory system 110 performs the write operation of the write data WT_DAT on the second physical address PA_2. In step S225, the memory system 110 may search a physical address corresponding to the first logical address LA_1 in the map data (L2P controller map data L2P_MAP_C stored in the memory 144). In step S235, the memory system 110 invalidates the searched physical address in the L2P controller map data L2P_MAP_C.

In step S245, the memory system 110 may map the first logical address LA_1 to the second physical addresses PA_2 on which the write operation has been performed.

Subsequently, in step S255, the memory system 110 may transmit a third acknowledgement ACK3 including a message indicating that the write operation has been completely performed.

The memory system 110 according to an embodiment transmits a physical address or map information in which write data is stored, to the host 102 only when a read request for the write data is inputted from the host 102. The memory system 110 does not transmit the physical address or the map information in which the write data is stored, to the host 102 when the read request for the write data is not inputted from the host 102. Accordingly, overhead of the memory system 110 occurring due to unnecessary map transmitting may be reduced.

Figure 12B:
Figure 12C:

Hereinafter, a method for performing the write operation by the host 102 in accordance with an embodiment will be described with reference to FIGS. 7, 11 and 12A to 12C. FIG. 11 illustrates the method for performing the write operation by the host 102. FIGS. 12A to 12C illustrate an example of a command descriptor block of the write request WT_REQ (hereinafter, referred to as a "write request descriptor block") transmitted to the memory system 110 by the host 102. Although each of the write request descriptor blocks illustrated in FIGS. 12A to 12C is described with reference to a descriptor block of a universal flash storage (UFS), the invention is not limited thereto.

Referring to FIG. 11, the host 102 may generate the write request WT_REQ with the first logical address LA_1 relating to write data, in step S110. The host 102 determines whether map information of a first physical address PA_1 corresponding to the first logical address LA_1 is cached or included in the host map data MAP_H stored in the host memory 106, in step S130.

When the first physical address PA_1 is not cached in the host map data MAP_H (No in step S130), the host 102 transmits the write request WT_REQ with the write data WT_DAT and the first logical address LA_1 to the memory system 110 in step S135A.

When the first physical address PA_1 is cached in the host map data MAP_H (Yes in S130), the host 102 performs step S150. In step S150, the host 102 transmits the write request WT_REQ, the write data WT_DAT, the first logical address LA_1 and the first physical address PA_1 to the memory system 110.

To this end, the host 102 may transmit the write request WT_REQ of the write request descriptor block illustrated in FIGS. 12A to 12C, to the memory system 110. Each of the rows of the write request descriptor block illustrated in FIGS. 12A to 12C includes each byte. The write request descriptor block of FIG. 12A may include zeroth to fifth bytes 0 to 5, the write request descriptor block of FIG. 12B may include zeroth to ninth bytes 0 to 9, and the write request descriptor block of FIG. 12C may include zeroth to 15th bytes 0 to 15. Each of the columns of the write request descriptor block includes a bit included in each byte. For example, the bytes of each of the write request descriptor blocks illustrated in FIGS. 12A to 12C may include zeroth to seventh bits 0 to 7. In addition, the zeroth to seventh bits 0 to 7 of the zeroth byte 0 of the write request descriptor block may include an operation code. For example, the operation code of the write request may be set in advance. The write request descriptor block may include a logical address region in which the logical address is stored.

The zeroth to fourth bits 0 to 4 of the first byte 1 and the second and third bytes 2 and 3 of the write request descriptor block illustrated in FIG. 12A are the logical address regions. The fifth to seventh bits 5 to 7 of the first byte 1 may be reserved regions.

The second to fifth bytes 2 to 5 of the write request descriptor block illustrated in FIG. 12B are the logical address regions. The second bit 2 of the first byte 1 and the second to seventh bits 2 to 7 of the sixth byte 6 may be the reserved regions. The second to ninth bytes 2 to 9 of the command descriptor block illustrated in FIG. 12C are the logical address regions. The zeroth and second bits 0 and 2 of the first byte 1 and the fifth to seventh bits 5 to 7 of the 14th byte 14 may be the reserved regions.

The host 102 may include the first logical address LA_1 in the logical address region of each of the write request descriptor blocks illustrated in FIGS. 12A to 12C, and transmit the first logical address LA_1 to the memory system 110. In addition, according to an embodiment, the host 102 may include the first physical address PA_1 in a portion of the reserved region or the logical address region of each of the write request descriptor blocks illustrated in FIGS. 12A to 12C, and transmit the first physical address PA_1 to the memory system 110.

Referring back to FIG. 11, the host 102 determines whether a first acknowledgement ACK1 is received from the memory system 110, in step S250A. The first acknowledgement ACK1 may include a message indicating that the write operation for the write request WT_REQ transmitted to the memory system 110 in step S150 is completely performed. In addition, the first acknowledgement ACK1 may further include a message indicating that the first physical address PA_1 transmitted to the memory system 110 in step S150 is invalidated by the memory system 110.

When the first acknowledgement ACK1 is not received (No in step S250A), the host 102 may wait until the first acknowledgement ACK1 is received or request the memory system 110 to transmit the first acknowledgement ACK1.

When the first acknowledgement ACK1 is received (Yes in step S250A), in step S270, the host 102 may transmit a read request RD_REQ to the memory system 110, in order to request a read of the write data corresponding to the first logical address LA_1 requested for writing in step S150.

The read request RD_REQ transmitted to the memory system 110 in step S270 is a command for the host 102 to access the write data corresponding to the first logical address LA_1 stored in the memory system 110. When the write data corresponding to the first logical address LA_1, stored in the memory system 110, is required for an operation performed by the host 102, the host 102 may transmit the read request RD_REQ to the memory system 110 to read the write data.

Subsequently, the host 102 may receive read data RD_DAT and a second acknowledgement ACK2 from the memory system 110 in response to the read request RD_REQ in step S290A.

The second acknowledgement ACK2 may include a second physical address PA_2 or map information of the second physical address PA_2. The read data RD_DAT is stored in a page corresponding to the second physical address PA_2 in the memory system 110 in step S150.

Accordingly, the host 102 may invalidate the first physical address PA_1 mapped to the first logical address LA_1 included in the map data MAP_H of the host 102 or release the first physical address PA_1 from being associated with the first logical address LA_1.

The host 102 may update the map data MAP_H of the host 102 by mapping the second physical address PA_2 received in step S290A to the first logical address LA_1, in step S310.

Figure 13:
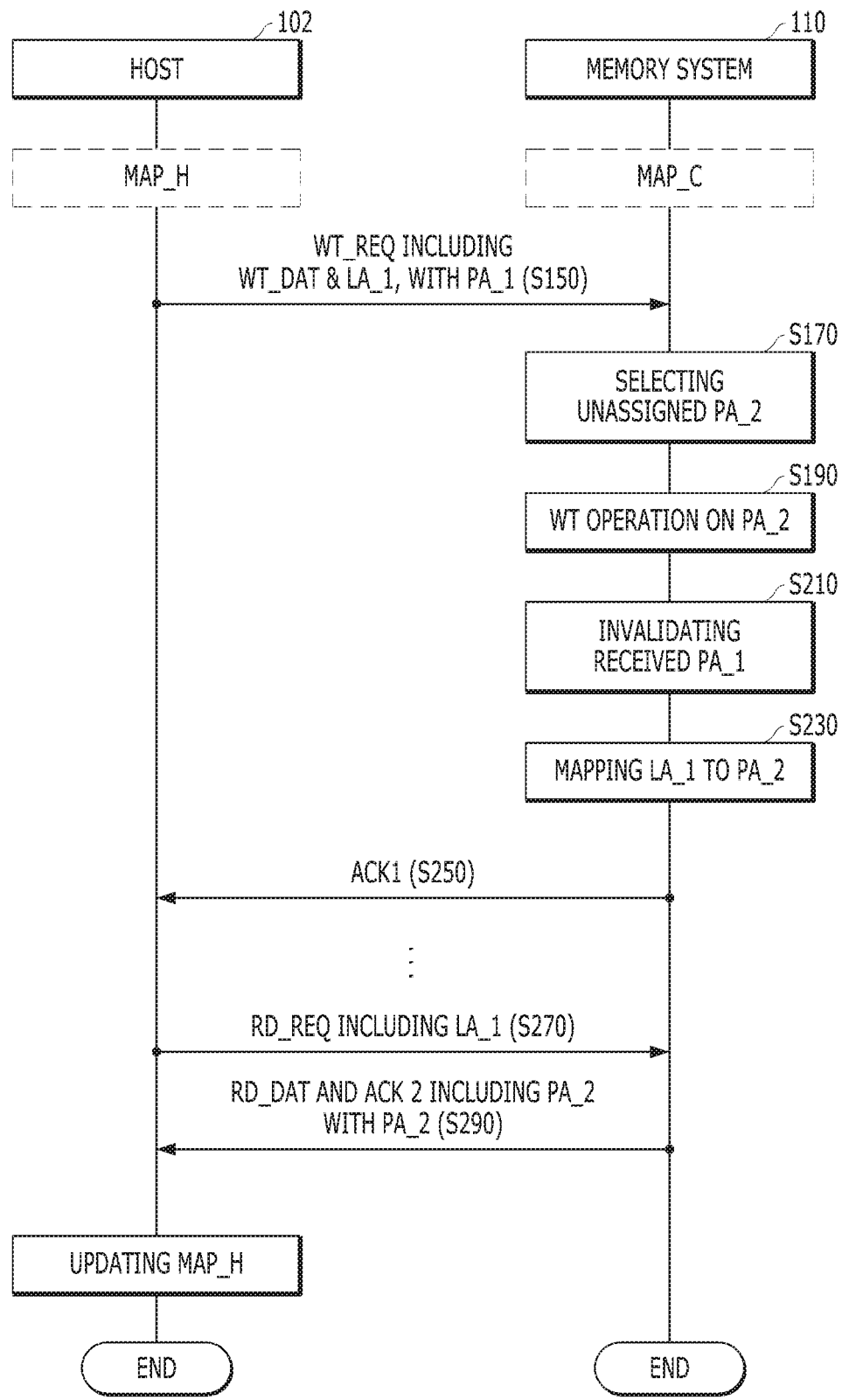
FIG. 13 is a flowchart illustrating a method for performing a write operation in a data processing system illustrated in FIG. 7.

Hereinafter, a method for performing the write operation by the data processing system 100 in accordance with an embodiment will be described with reference to FIG. 13.

The host 102 transmits the write request WT_REQ, the write data WT_DAT, the first logical address LA_1 and the first physical address PA_1 corresponding to the first logical address LA_1 to the memory system 110, in step S150.

When the memory system 110 receives the write request WT_REQ, the write data WT_DAT, the first logical address LA_1 and the first physical address PA_1 corresponding to the first logical address LA_1 from the host 102, the memory system 110 selects the second physical address PA_2 which is an unassigned state where a logical address is not assigned, in step S170.

The unassigned state includes a state in which data is not written. For example, a location where data is written in a current open block may be the second physical address PA_2. In step S190, the memory system 110 may include, as the second physical address PA_2, a physical address of an erase page that is physically consecutive to a program page included in the open block. In addition, the memory system 110 may include, as the second physical address PA_2, a physical address of a first page included in a free block to which data is to be written.

In step S190, the memory system 110 performs the write operation for the write data WT_DAT, inputted from the host 102, on the second physical address PA_2. At this time, the memory system 110 may sequentially perform the write operation on a plurality of pages when a size of the write data WT_DAT is larger than a storage capacity of one page. In step S190, the memory system 110 maps the first logical address LA_1 received from the host 102 and the second physical address PA_2 or a plurality of second physical addresses on which the write operation has been performed. According to an embodiment, mapping information or a mapping table may have various structures of coupling the logical address to the physical address, according to a size of data. For example, when a size of a piece of data indicated by a single logical address is 512 bytes and a size of a single page in a memory device is 2 KB or 4 KB, the single logical address may be associated with plural physical addresses indicating a plurality of pages.

In step S210, the memory system 110 invalidates the first physical address PA_1. The invalidation of the first physical address PA_1 in step S210 may indicate releasing the first physical address PA_1 from being associated with the logical address corresponding to the first physical address PA_1 in the map data, and thus data stored in the memory device corresponding to the first physical address PA_1 may be invalidated.

As described above, when the first logical address LA_1 is received with the write request WT_REQ from the host 102, the memory system 110 according to an embodiment searches for the physical address, corresponding to the first logical address LA_1, in the L2P controller map data L2P_MAP_C stored in the memory 144, checks whether the logical address corresponding to the physical address searched in the P2L controller map data P2L_MAP_C coincides with the first logical address LA_1 received from the host 102, and then does not invalidate the searched physical address. Since the memory system 110 according to an embodiment directly invalidates the first physical address PA_1, received with the first logical address LA_1 from the host 102, without a separate search for map data, the speed of the invalidation operation for the first physical address PA_1 may be improved, and thus the speed of the write operation may also be improved.

In addition, in step S210, the memory system 110 may change a state value of the first physical address PA_1, which has been released from mapping, in invalid address information INVALID_INF that is managed in one of a bitmap, flag, table or list form, thereby invalidating the first physical address PA_1 in step S170. Thus, an embodiment may provide an effect of increasing the efficiency of managing invalid data.

After performing step S170, the memory system 110 may reduce a valid page count VPC for a memory block, corresponding to the first physical address PA_1. Thereafter, the memory system 110 may perform the garbage collection (GC) operation on a memory block having a valid page count VPC less than a predetermined value, thereby improving efficiency of the background operation. For example, the memory system 110 may generate a free block by performing the erase operation on a memory block having a valid page count VPC of 0, thereby increasing utilization of the memory device.

The memory system 110 maps the first logical address LA_1 received from the host 102 to one or more second physical addresses PA_2 on which the write operation has been performed.

The memory system 110 may include a message indicating the write operation is completely performed, in a first acknowledgement ACK1 for the write request WT_REQ received in step S150, and upload the first acknowledgement ACK1 to the host 102, in step S250. In addition, the memory system 110 according to the present embodiment may further include a message indicating that the first physical address PA_1 received from the host 102 has been invalidated, in the first acknowledgement ACK1, and upload the first acknowledgement ACK1 to the host 102. The first acknowledgement ACK1 may not include the second physical address PA_2 corresponding to the first logical address LA_1 in step S230.

The host 102 may receive the first acknowledgement ACK1 from the memory system 110, and then transmit the read request RD_REQ and the first logical address LA_1 to the memory system 110, in step S270.

When the read request RD_REQ and the first logical address LA_1 is inputted from the host 102, the memory system 110 may determine that data corresponding to the first logical address LA_1 is a type of hot data frequently read by the host 102. In this case, the data corresponding to the first logical address LA_1 is the write data WT_DAT received from the host 102 in step S150, and is stored in the memory system 110 by the write operation of step S210. In step S290, the memory system 110 may transmit, to the host 102, a second physical address PA_2 corresponding to the first logical address LA_1, and data stored in a page corresponding to the second physical address PA_2.

In addition, in step S290, the memory system 110 may transmit, to the host 102, L2P controller map data L2P_MAP_C corresponding to the first logical address LA_1 and the second physical address PA_2, and the read data RD_DAT which is stored in the memory device and accessed by the second physical address PA_2.

The host 102 may map the second physical address PA_2 received in step S290 to the first logical address LA_1, and update the host map data MAP_H.

As described above, operational efficiency of the memory system 110 and the data processing system 100 may be increased according to various embodiments described with reference to FIGS. 1 to 13.

According to an embodiment, since a first physical address received with a first logical address from an external device is directly invalidated without a separate search for map data, the speed of an invalidation operation of the first physical address may be improved, and thus the speed of a write operation may be also improved.

According to an embodiment, as a value corresponding to a first physical address is changed in state information managed in at least one of a bitmap, flag, table or list structures, the first physical address received from an external device may be invalidated. Accordingly, the efficiency of invalid data management may be increased.

According to an embodiment, a first physical address received from an external device may be invalidated, and then a valid page count of a memory block corresponding to the first physical address in valid storage element information may be reduced. Subsequently, the memory system may perform a garbage collection (GC) operation on a memory block having a valid page count which is less than a predetermined value, thereby improving efficiency of a background operation.

According to an embodiment, an erase operation may be performed on a memory block having a valid page count of "0", and then a free block may be generated, thereby improving utilization of a memory device.

According to an embodiment, only when an external device requests data stored in the memory system, to be accessed (for example, a read request), is a newly-corresponding physical address transmitted to the external device. Accordingly, L2P controller map data of data, which the external device does not request to be accessed, may not be transmitted to the external device, thereby reducing overhead of the memory system occurring due to unnecessary map up/down loading.

While the present invention has been described with respect to specific embodiments, it will be apparent to those skilled in the art that various changes and modifications may be made without departing from the spirit and scope of the invention as defined in the following claims.

What is claimed is:

1. A memory system comprising:
a memory device suitable for storing L2P map data including a logical address of an external device and a physical address of the memory device corresponding to the logical address; and
a controller suitable for storing at least a portion of the L2P map data and state information of the L2P map data, and controlling data input/output of the memory device,
wherein, when a write request including write data, a first logical address, and a first physical address are received from an external device, the controller performs a write operation on a page in which data is not stored and is identified by a second physical address, and invalidates the first physical address,
the controller transmits a first acknowledgement, which does not include the second physical address, to the external device, after completely performing the write operation, and
the controller transmits the second physical address to the external device when a read request for the write data with the first logical address is received from the external device after the write operation is performed.

2. The memory system of claim 1, wherein,
the controller transmits the write data as a read data stored at the second physical address of the memory device with the second physical address to the external device.

3. The memory system of claim 1, wherein the controller invalidates the first physical address by changing a value of state information corresponding to the first physical address.

4. The memory system of claim 3, wherein the state information includes invalid address information.

5. The memory system of claim 1, wherein the controller invalidates the first physical address, and reduces a valid page count of a memory block corresponding to the invalidated first physical address.

6. The memory system of claim 5, wherein the controller performs a garbage collection operation on a memory block having the valid page count less than a predetermined value.

7. The memory system of claim 5, wherein the controller performs an erase operation on a memory block having the valid page count of 0.

8. The memory system of claim 1, wherein the controller transmits the second physical address after a read request for the first logical address is received.

9. A method for controlling a memory system which includes a controller suitable for storing L2P map data including a logical address of an external device and a physical address of a memory device corresponding to the logical address, and state information of the L2P map data, the method comprising:

receiving a write request including write data, a first logical address and a first physical address corresponding to the first logical address from the external device;

searching for a second physical address which is not mapped to a logical address;

performing a write operation for the write request on a page corresponding to a found second physical address;

invalidating the first physical address transmitting a first acknowledgement, which does not include the found second physical address, to the external device; and transmitting the second physical address to the external device when a read request for the write data with the first logical address is received from the external device after the write operation is performed.

10. The method of claim 9, further comprising transmitting data stored in a memory device corresponding to the found second physical address with the found second physical address to the external device.

11. The method of claim 9, wherein the invalidating of the first physical address comprises changing a value of state information corresponding to the first physical address.

12. The method of claim 11, wherein the state information comprises invalid address information.

13. The method of claim 9, further comprising reducing a valid storage element count of a memory block corresponding to the first physical address after the invalidating of the first physical address.

14. The method of claim 13, wherein a garbage collection operation is performed on a memory block having the valid storage element count less than a predetermined value after the reducing of the valid storage element count.

15. The method of claim 13, wherein an erase operation is performed on a memory block having the valid storage element count of 0 after the reducing of the valid storage element count.

16. A data processing system comprising:
a memory system that includes a controller suitable for storing data in a memory device; and
a host that interworks with the memory system,
wherein the host stores at least a portion of map information used in the memory system, and transmits the write request including write data, a first logical address and a first physical address associated with the first logical address to the memory system by searching for the first physical address in the at least some of map information,
wherein, when the first physical address is transmitted with the write request from the host, the memory system performs a write operation on a page corresponding to a second physical address which is not assigned a logical address, and invalidates the first physical address, and
when a read request for the write data with the first logical address is received from the host, the memory system transmits the second physical address and a data stored at the second physical address of the memory device in a response to the read request, to the host.

17. The data processing system of claim 16, wherein the memory system invalidates the first physical address by changing a value of state information corresponding to the first physical address.

18. The data processing system of claim 17, wherein the state information comprises invalid address information.

19. The data processing system of claim 16, wherein the read request is a request for the host to access data corresponding to the first logical address stored in the memory system.

20. A memory system comprising:
a memory device for storing plural pieces of map data, each associating a logical address used by an external device with a physical address used by the memory system; and
a controller for loading pieces of map data from the memory device, receiving a write request along with a piece of write data, which are inputted from the external device, performing a write operation on a page in which data is not stored, and releasing a piece of map data relevant to the physical address in loaded pieces of map data based on whether the write request is inputted along with the physical address,
wherein the controller transmits a physical address of the page in which the write operation is performed to the external device when a read request for the write data with a logical address is received from the external device after the write operation is performed.

* * * * *